Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 1
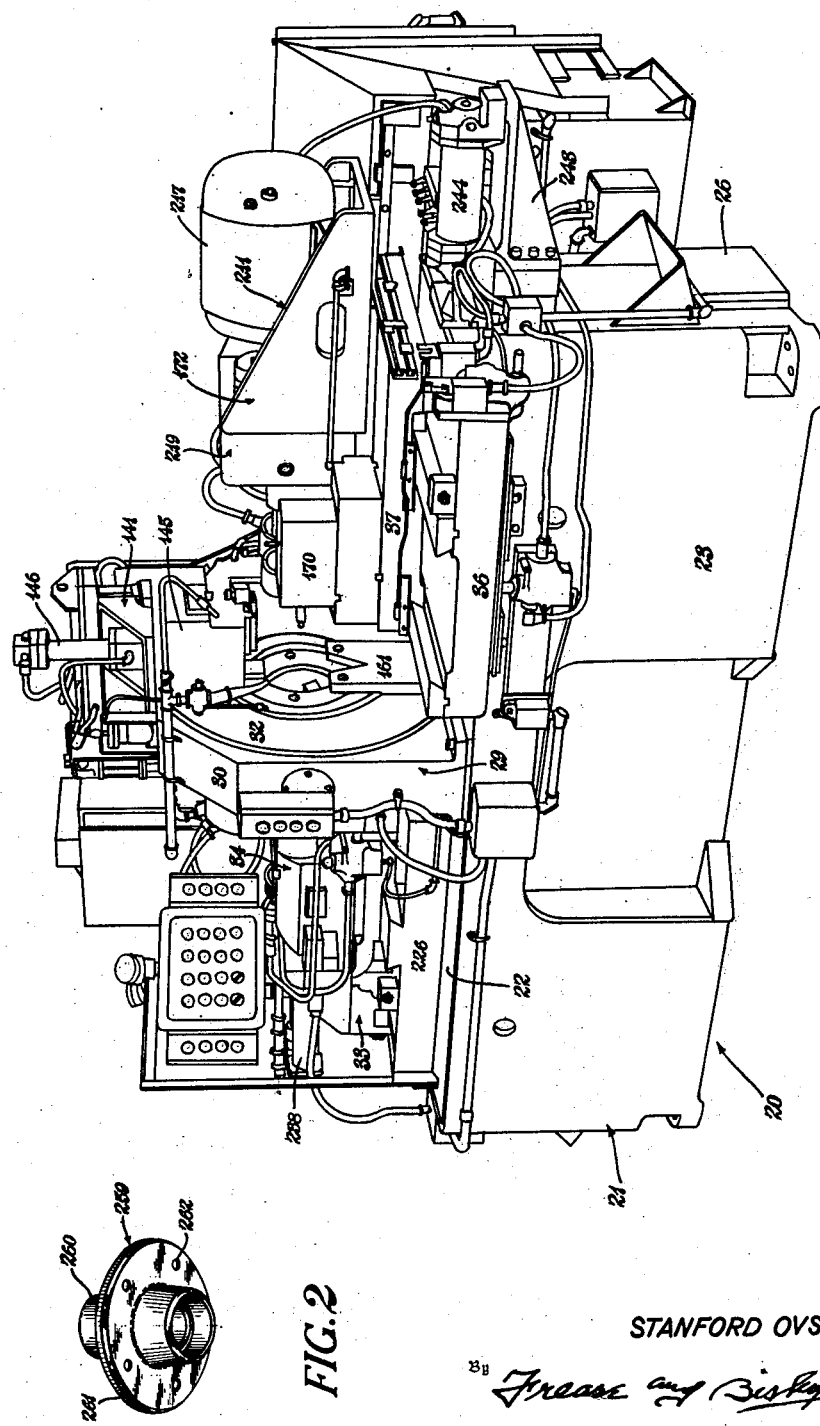
Inventor
STANFORD OVSHINSKY
By Frease and Bishop
Attorneys Dec. 2, 1952　　　　　S. OVSHINSKY　　　　2,619,710
MACHINE TOOL FOR MACHINING ARTICLES HAVING
HOLED ANNULAR FLANGES AND THE LIKE
Filed Feb. 5, 1951　　　　　　　　　　　16 Sheets-Sheet 2
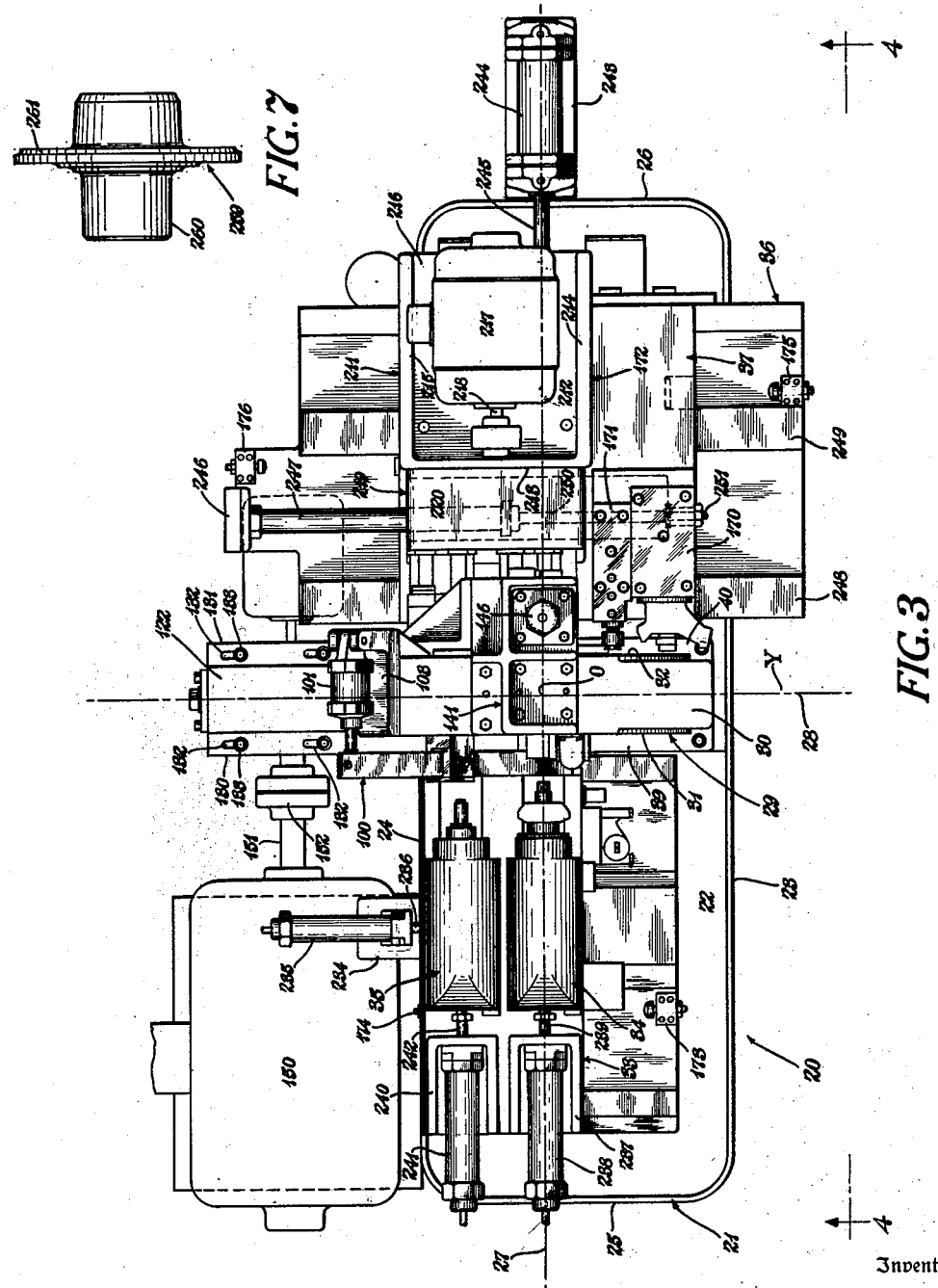
Inventor
STANFORD OVSHINSKY
By Froase and Bislof
Attorneys

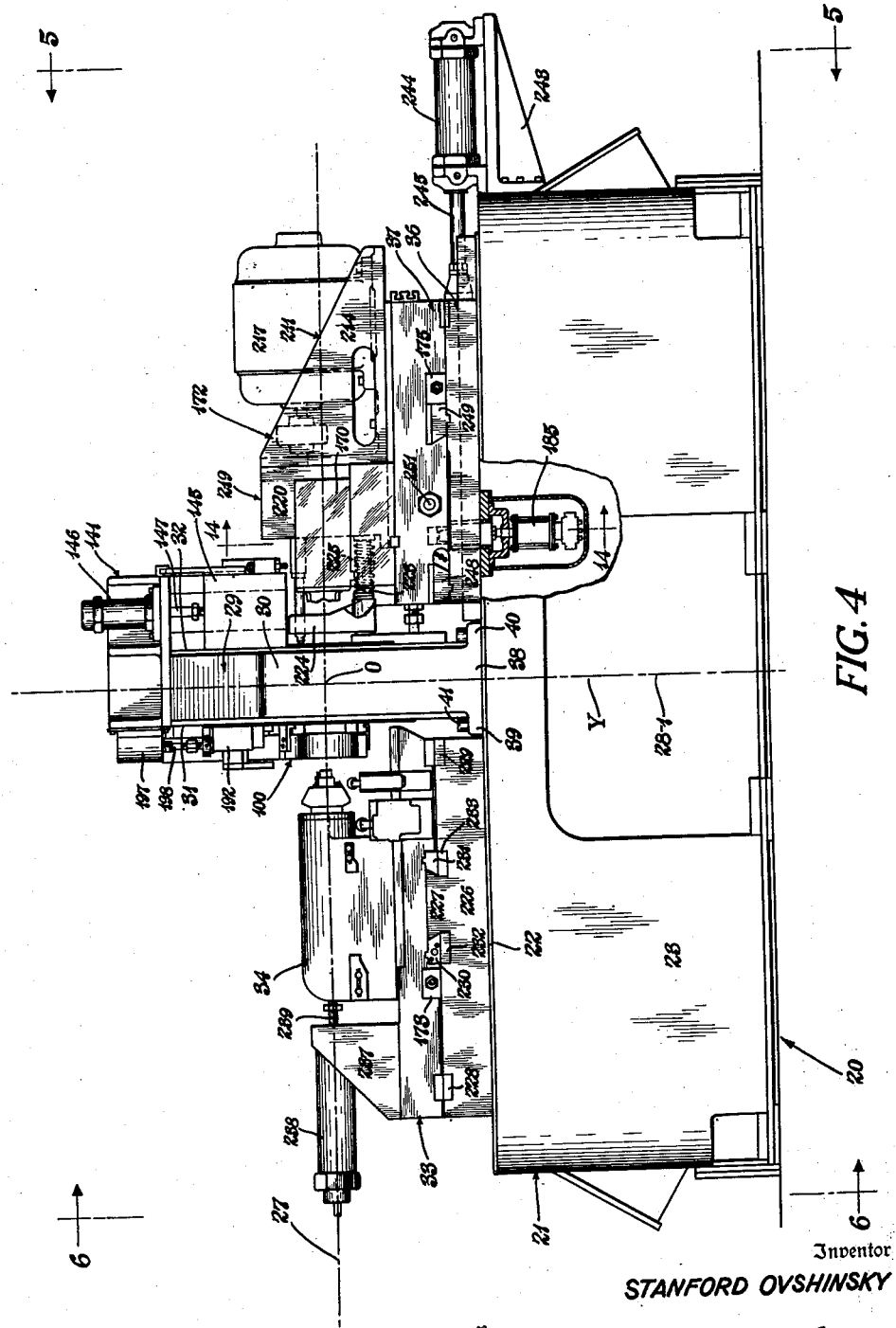

Inventor
STANFORD OVSHINSKY
Attorneys

Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 6

Inventor
STANFORD OVSHINSKY

By
Frease and Bishop
Attorneys

Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 8

Inventor
STANFORD OVSHINSKY
By Frease and Bishop
Attorneys

Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 9

Inventor
STANFORD OVSHINSKY
By Frease and Bishop
Attorneys

Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 10

Inventor
STANFORD OVSHINSKY

Attorney

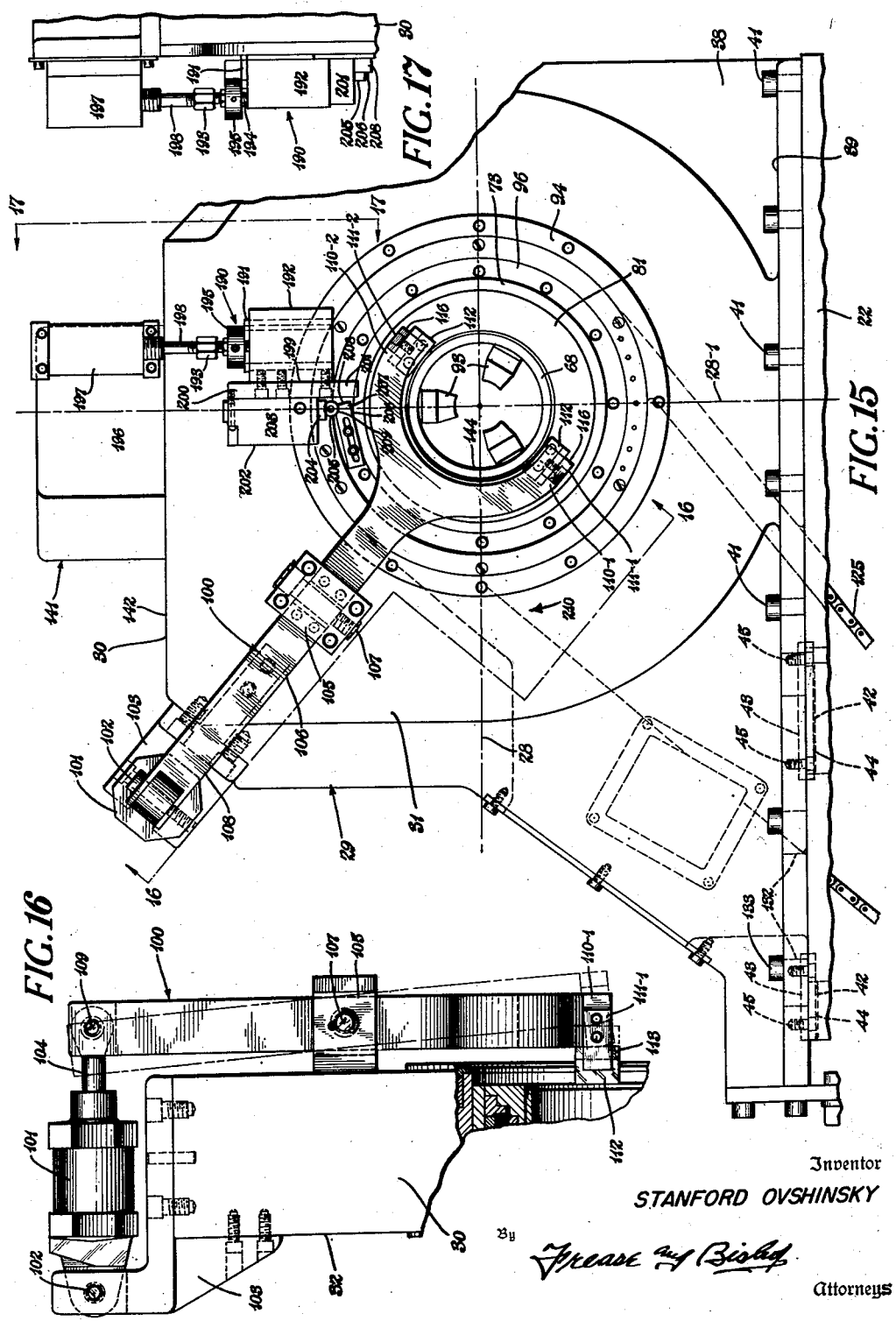

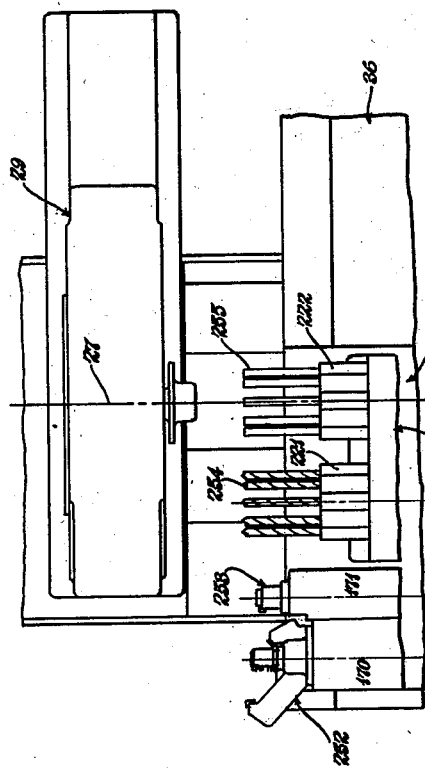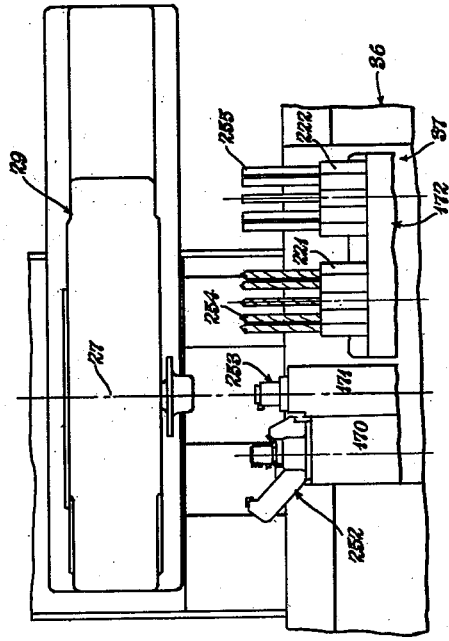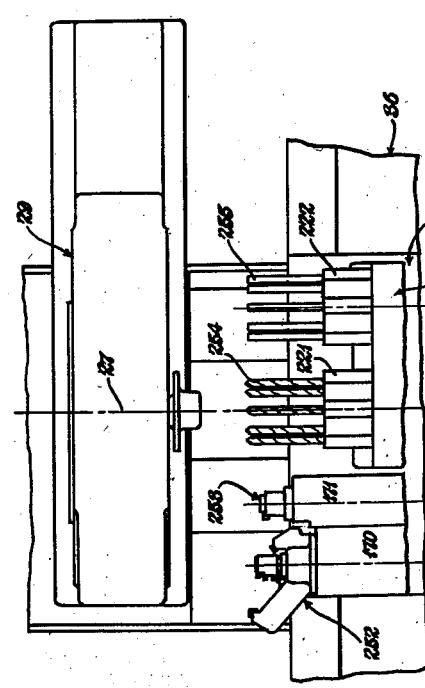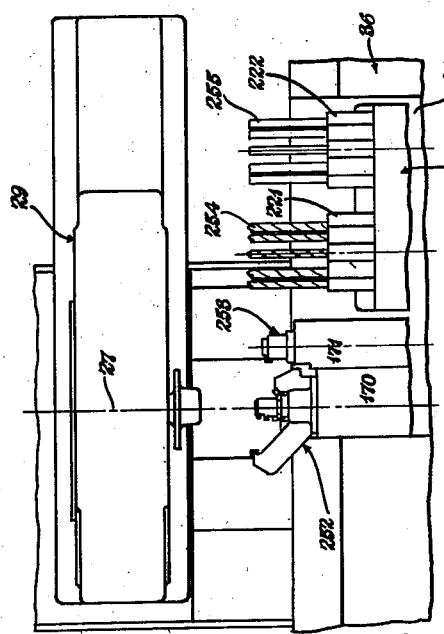

Dec. 2, 1952 S. OVSHINSKY 2,619,710
MACHINE TOOL FOR MACHINING ARTICLES HAVING
HOLED ANNULAR FLANGES AND THE LIKE
Filed Feb. 5, 1951 16 Sheets-Sheet 13

Inventor
STANFORD OVSHINSKY

By
Attorneys

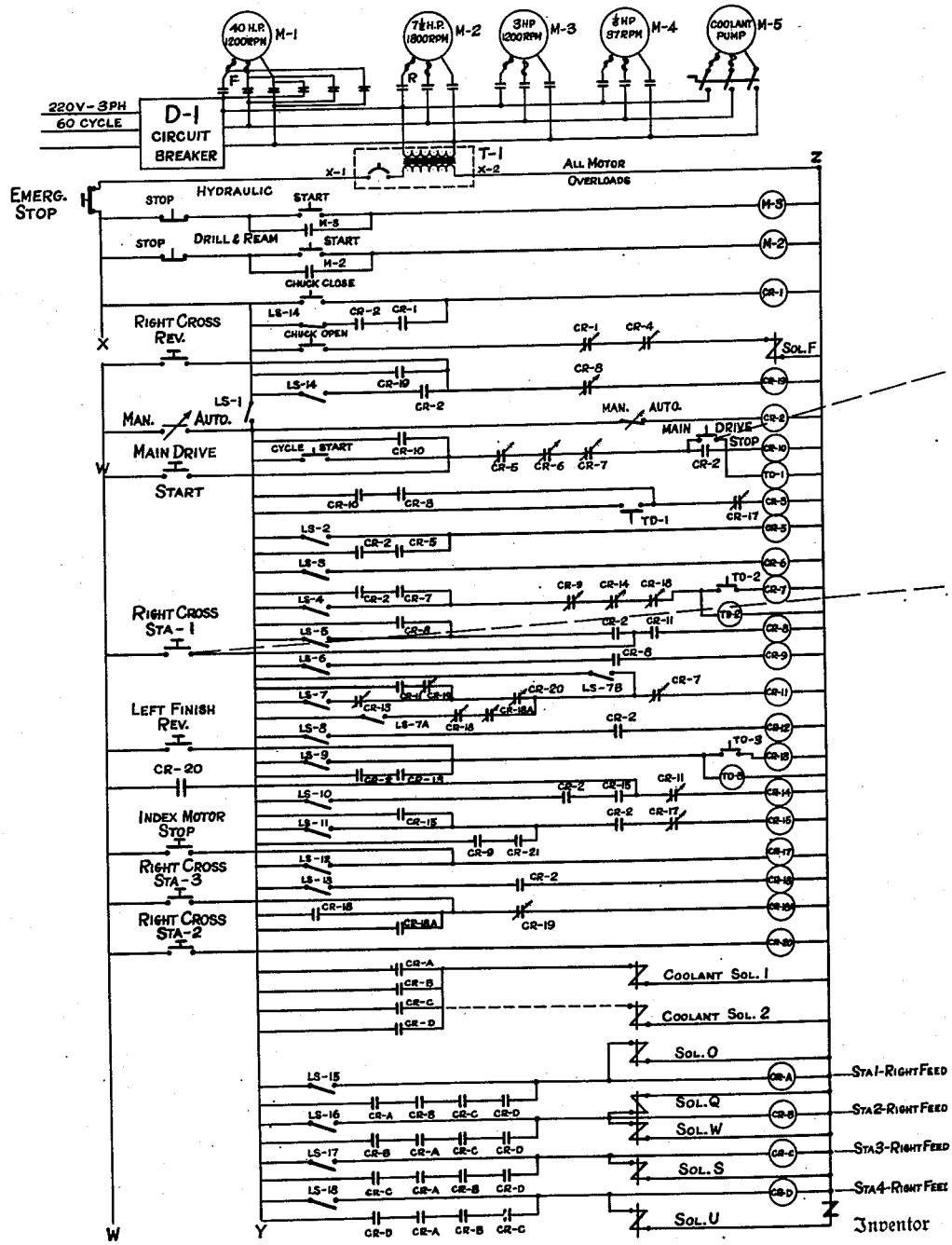
FIG.25-A

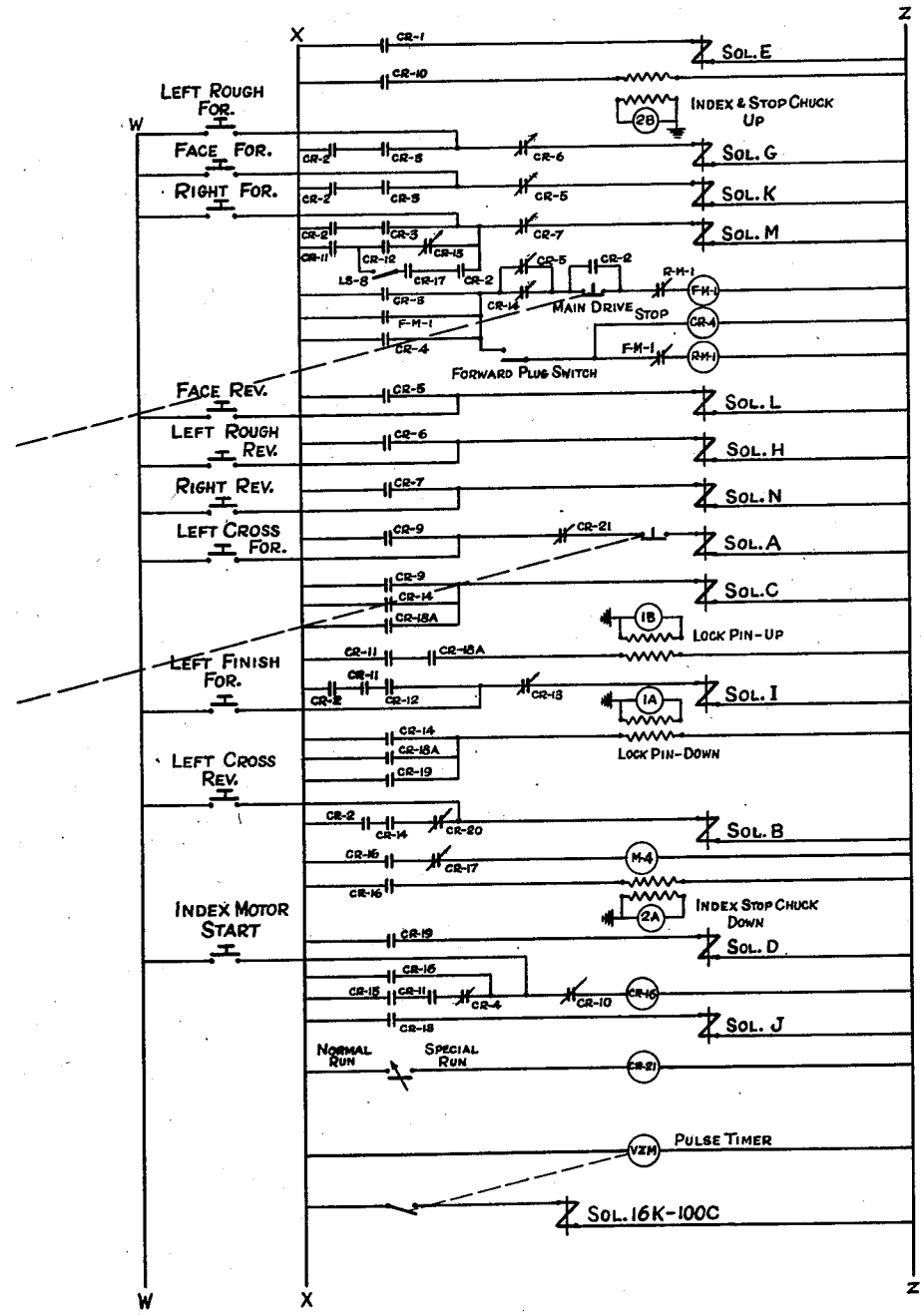
FIG. 25-B

Patented Dec. 2, 1952

2,619,710

UNITED STATES PATENT OFFICE 2,619,710

MACHINE TOOL FOR MACHINING ARTICLES HAVING HOLED ANNULAR FLANGES AND THE LIKE

Stanford Ovshinsky, New Britain, Conn., assignor to The Stanford-Roberts Manufacturing Company, Akron, Ohio, a corporation of Ohio Application February 5, 1951, Serial No. 209,453

23 Claims. (Cl. 29—29)

This invention or discovery relates in general to machine tools for machining articles having holed annular flanges and the like, and more particularly to such a machine tool adapted for automatic operation and for the precision machining of a metal article having a holed annular flange, such as a hub for an automobile wheel.

Such a hub may include a cylindrical sleeve portion intermediate the ends of which is located a radially outwardly extending annular flange in which there are formed a plurality of circumferentially spaced holes. In use, the flange of such a hub is abutted against one face of the disc portion of a brake drum, and the brake drum is secured thereto by rivet studs, the rivet shanks of which extend through holes in the brake drum disc portion which register with the holes in the hub flange. The stud bodies are threaded for removable connection thereof with an automobile wheel having a disc portion with holes through which the threaded stud bodies extend, and nuts are screwed on the threaded stud bodies and clamp the wheel disc portion against the hub flange.

Such a hub must be machined to an accuracy of plus or minus .001 inch, and the machining operations may include the following single or multiple operations:

(1) Rough bore and counterbore sleeve at each end;
(2) Face and chamfer sleeve at each end;
(3) Turn periphery of flange;
(4) Face and shoulder opposite sides of flange;
(5) Finish bore and counterbore sleeve at each end;
(6) Drill and chamfer holes in flange; and
(7) Ream holes in flange.

Operations (1), (2), (3), (4), and (5) are turning operations in which the workpiece, that is the rough steel forging for the hub, is held in a chuck and rotated about the chuck axis of rotation and the cutting tools are non-rotating the chuck axis of rotation about; whereas operations (6) and (7) are holing operations carried out by holding the workpiece stationary with respect to the drills and reamers and rotating the drills and reamers.

It has been the usual practice, prior to the present improvements, to carry out the turning operations in one or more machines of the lathe type, and to carry out the holing operations in multiple drill presses or by a rotary drill head rotating in synchronization with the rotating workpiece. This has necessitated chucking of the workpiece for each turning operation carried on in successive different lathe type machine tools, transferring the turned workpiece to a drill press, securing the turned workpiece in a vise in the drill press, and then carrying out the drilling and reaming operations, which may require another transfer of the workpiece with the drilled holes therein to another drill press for the reaming operation. The use of a rotary drill head has been infrequent.

The required chucking of the workpiece one or more times for the turning operations, the transferring of the workpiece, and the vise clamping of the turned workpiece one or more times for the holing operations are not only time consuming, but it is very difficult in such a production procedure to accurately locate the drilled and reamed holes with respect to the axis of the bores and counterbores of the hub sleeve, which themselves may not be co-axial with each other.

The objects of the present invention or discovery include the provision of an improved machine tool for machining articles having holed annular flanges and the like, and which are adapted for semi-automatic operation whereby, after the chucking of a workpiece therein by the operator, a cycle of automatic operations is performed on the workpiece including a plurality of turning operations and a plurality of holing operations, the machine stopping at the end of the automatic cycle of operations for permitting unloading of the finished workpiece by the operator, and reloading of a new workpiece.

Further objects of the present invention or discovery include the provision of such a machine tool in which are combined together for such semi-automatic operation a plurality of component mechanisms or sub-assemblies in certain of which are included improved details of construction and operation.

The foregoing and other objects are attained by the machine tool constructions, apparatus, improvements, parts, combinations, and sub-combinations which comprise the present invention or discovery, the nature of which is set forth in the following general statement, and preferred embodiments of which together with their mode of use are set forth by way of example in the following description, and which are particularly and distinctly pointed out and set forth in the appended claims forming part hereof.

The nature of the improved machine tool of the present invention or discovery may be stated in general terms as including chucking apparatus preferably of the center drive type, the chucking apparatus including rotatable chuck jaws adapted for chucking and releasing a workpiece including a cylindrical sleeve portion and an annular flange extending radially outwardly from the sleeve portion. A plurality of turning tools are operatively associated with the chucking apparatus whereby a plurality of turning operations may be performed on the workpiece, preferably in groups during rotation of the chuck jaws while holding the workpiece. Holing apparatus is operatively associated with the chucking apparatus, the holing apparatus including one or more sets of holing tools, and means coordinated with the operation of each set of holing tools, whereby the rotary workpiece mounting jaws of the chuck are positively stopped against rotation, and hold the workpiece stationary during the operation of each set of holing tools on the workpiece.

By way of example, preferred embodiments of the machine tool of the present invention or discovery and of component mechanisms, sub-combinations, and parts thereof are illustrated in the accompanying drawings forming part hereof in which:

Figure 1 is a perspective view made from a photograph and showing a preferred embodiment of the machine tool of the present invention or discovery;

Fig. 2 is a perspective view showing an article having holed annular flanges, and which is adapted to be machined completely in the improved machine tool of Fig. 1 by an automatic cycle of operations including a plurality of turning operations and a plurality of holing operations;

Fig. 3 is a top plan view of the improved machine tool of Fig. 1, certain of the hydraulic and electrical parts thereof being removed;

Fig. 4 is a front elevational view of the improved machine tool hereof looking in the direction of the arrows 4—4, Fig. 3;

Fig. 7 is a side elevational view of the workpiece shown in Fig. 2;

Fig. 15 is a fragmentary transverse view looking in the direction of the arrows 15—15, Fig. 8, and illustrating in elevation the other end of the improved chuck unit hereof;

Fig. 16 is a fragmentary oblique side elevational view thereof as on line 16—16, Fig. 15;

Fig. 17 is another fragmentary elevational view thereof looking in the direction of the arrows 17—17, Fig. 15;

Figure 22:
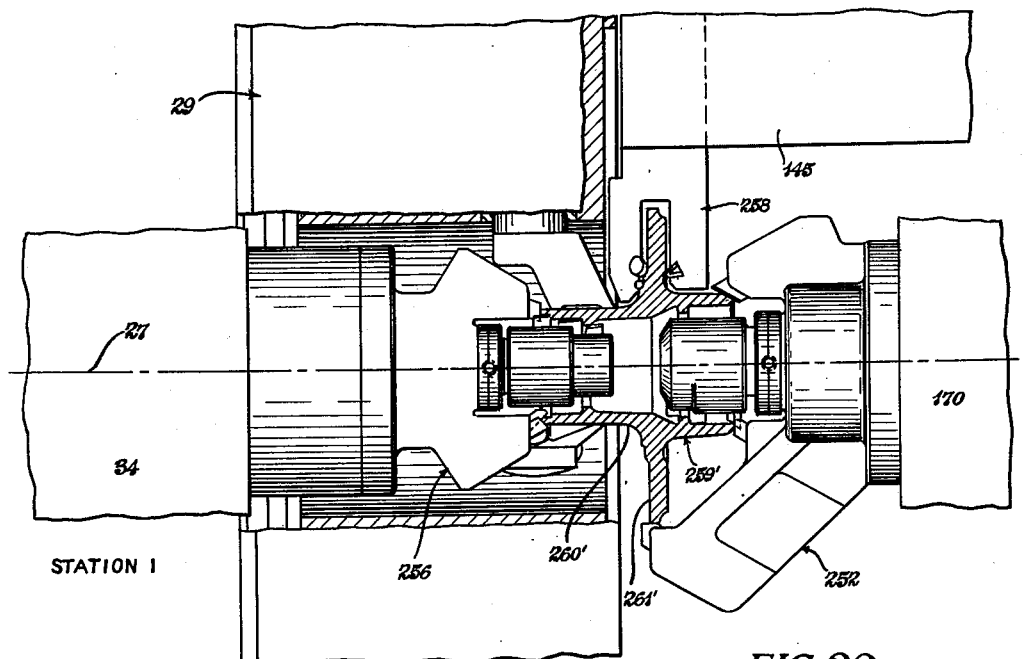
Figure 23:
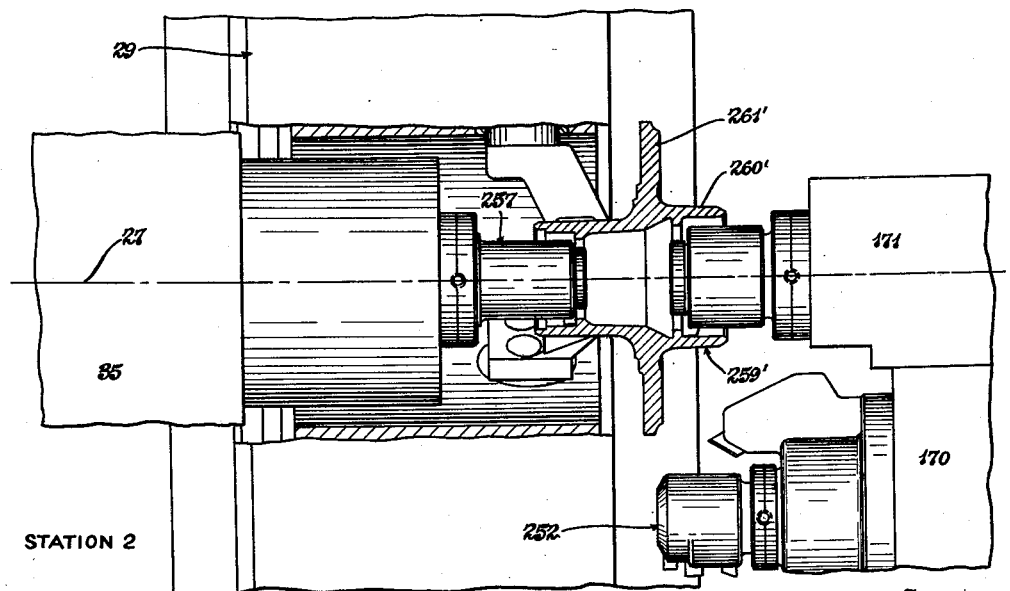
Figure 24:
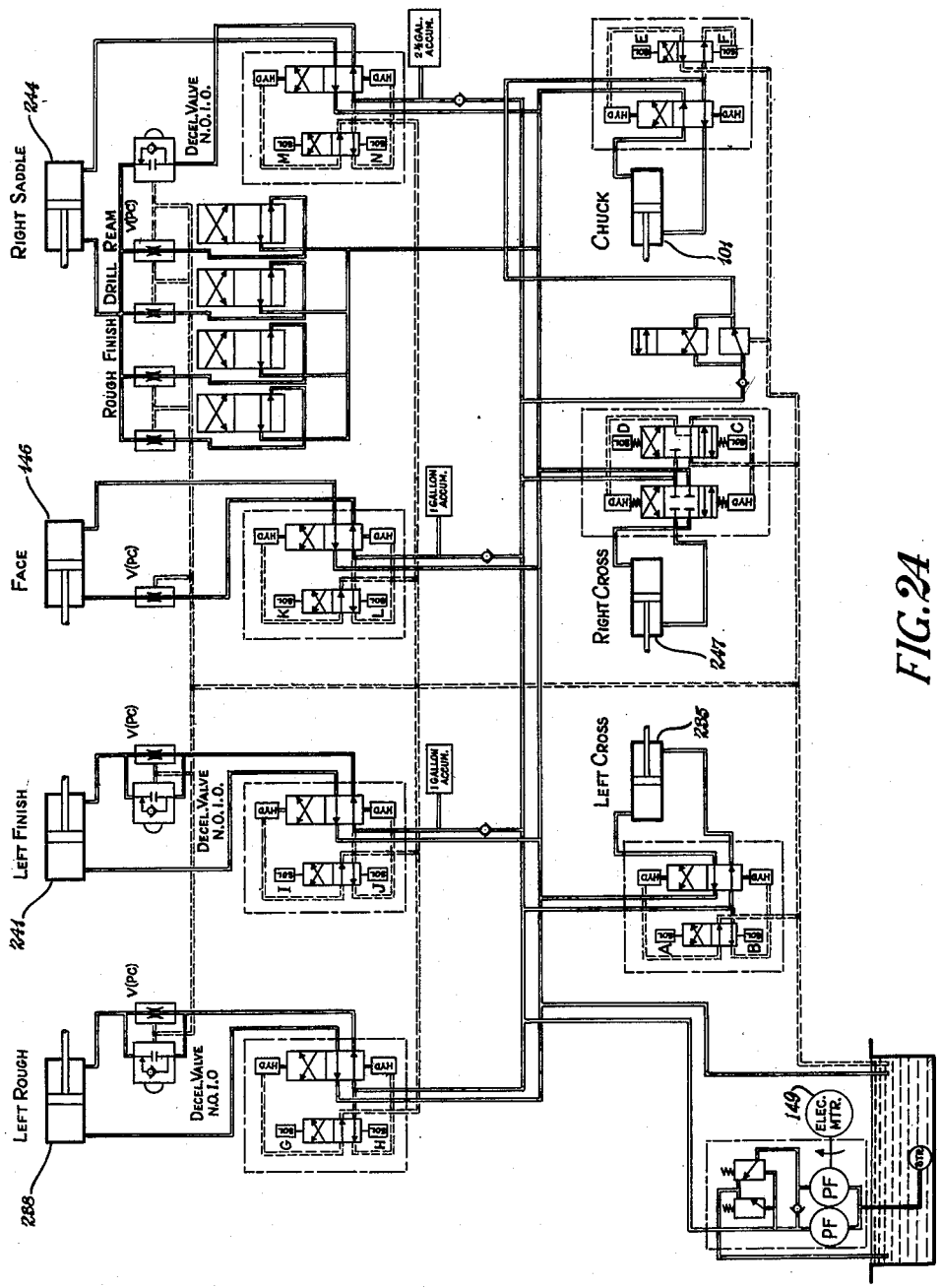

Figs. 18, 19, 20, and 21 are each a fragmentary diagrammatic top plan view showing the right side of the improved machine tool hereof and successively the positions of the right cross slide and the tools thereon at each of stations 1, 2, 3, and 4 of the right cross slide and before advancement of the saddle carrying the right cross slide towards the chuck unit for the carrying out of the machining operations of the tools;

Figs. 22 and 23 are fragmentary diagrammatic elevational and plan views respectively with portions broken away and shown in sections showing the operation of the tools on a workpiece on both sides of the chuck at station 1, and at station 2;

Fig. 24 is a diagrammatic view showing the layout of the hydraulic equipment incorporated in and associated with the improved machine tool hereof; and Figs. 25-A and 25-B are complementary diagrammatic views showing the layout of the electrical equipment incorporated in and associated with the improved machine tool hereof.

Similar numerals refer to similar parts throughout the several views.

One embodiment of the improved machine tool of the present invention or discovery is indicated generally by 20, and referring more particularly to Figs. 1 and 3 to 6, inclusive, the machine tool 20 includes a base indicated generally by 21 which is generally in the form of an elongated rectangular box of arc-welded steel plate construction and includes an upper horizontal bed plate or wall 22, a front side wall 23, a back side wall 24, and end walls 25 and 26. The front and back side walls 23 and 24 join with the top wall 22 at top side corners, the end walls 25 and 26 join with the top wall 22 at top end corners, and the side walls 23 and 24 and the end walls 25 and 26 join with each other around at vertical end corners.

The improved machine tool 20 as illustrated is of substantial size, and of massive construction, the length of the base 21 being upwards of 96 inches, the width being upwards of 30 inches, and the height being upwards of 27 inches. The base 21 mounts high-speed operating units hereinafter described in detail.

Prior to the present improvements, in a machine tool of massive construction having a base whose dimensions are of the magnitude above indicated and mounting high-speed operating units, it has been considered that the base should be made of cast iron or cast steel in order to be sufficiently strong and rigid to mount the high-speed operating units without undesired vibrations being set up during use of the machine tool. In the improved machine tool 20, however, by the nature of the construction and arrangement of the operating units mounted on the base 21, as hereinafter set forth in detail, it has been found that the base 21, when made of arc-welded steel plate construction, is adequately strong and rigid for mounting the high-speed operating units so that undesired vibrations are not set up during use of the improved machine tool 20.

The operator of the improved machine tool 20 faces the front side wall 23 of the base, and the base end wall 25 is thus at the left of the operator and the base end wall 26 is at the right of the operator. For convenience in description, the base end wall 25 may be said to be at the left end of the machine tool 20, and the base end wall 26 may be said to be at the right end of the machine tool 20.

The base 21 of the machine tool 20 is elongated, and a longitudinally extending horizontal axis parallel with the side walls 23 and 24 is indicated by the dot-dash line 27 in Figs. 3 and 4, and a vertical plane Y intermediate the base end walls 25 and 26 and extending transversely of and perpendicular to the axis 27 is determined by the dot-dash axis lines 28 and 28–1, which are perpendicular to each other and to the axis 27, the axes 27, 28, and 28–1 intersecting each other at center 0.

An improved automatic rotary chuck unit indicated generally by 29 is mounted upon and extends upwardly from the bed plate 22 of the base 21. The improved automatic rotary chuck unit 29 is generally of the type set forth in my prior application for United States Letters Patent, Serial No. 52,719, and includes improvements thereon hereinafter set forth in detail, and includes rotary parts whose axis of rotation coincides with the axis 27 spaced above and parallel with the bed plate 22. The rotary and other operating parts of the chuck unit 29 are mounted in a housing 30 extending transversely of the base 21 and having a left end face 31 and a right end face 32 longitudinally spaced from and parallel with each other on opposite sides of the transverse intermediate plane Y.

At the left of the plane Y and the left end face 31 of the chuck unit 29, a cross slide indicated generally by 33 is operatively mounted for transverse movement parallel with the plane Y on the top of the bed plate 22. Laterally spaced tool holder blocks indicated generally by 34 and 35 are operatively mounted for independent longitudinal movements parallel with each other and with the axis 27 on the top of the cross slide 33.

At the right of the plane Y and the right end face 32 of the chuck unit 29, a carriage or saddle indicated generally by 36 is operatively mounted for longitudinal movement parallel with the axis 27 on the top of the bed plate 22. A cross slide indicated generally by 37 is operatively mounted for transverse movement parallel with the plane Y on the top of the saddle 36.

The several movements respectively of the cross slide 33, the tool holder blocks 34 and 35, the saddle 36, and the cross slide 37 are independently effected by means of separate reciprocating motors, as hereinafter set forth in detail.

Figure 5:
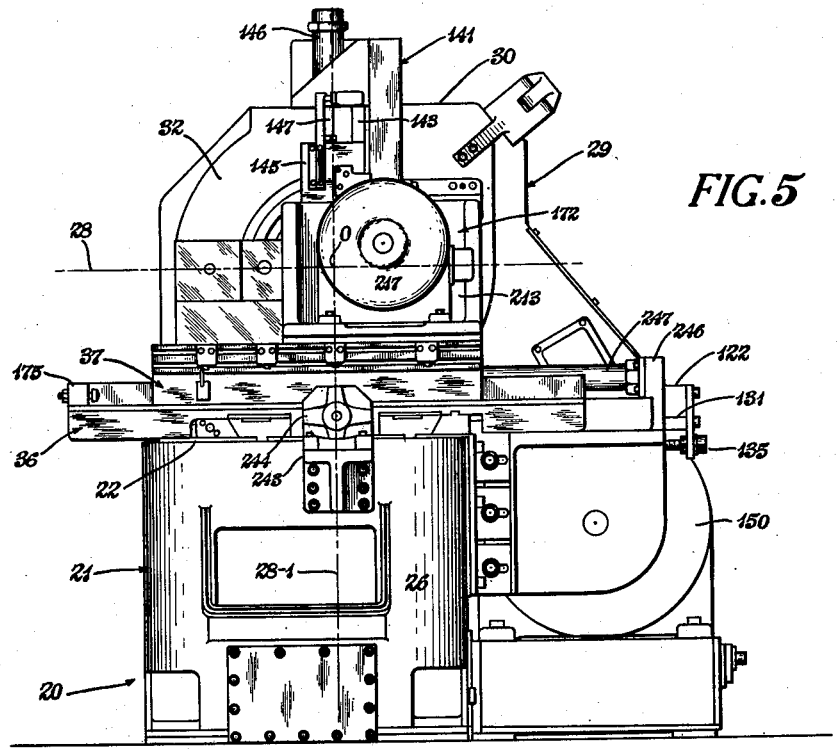
Fig. 5 is an elevational view of one end of the improved machine tool hereof looking in the direction of the arrows 5—5, Fig. 4.
Figure 6:
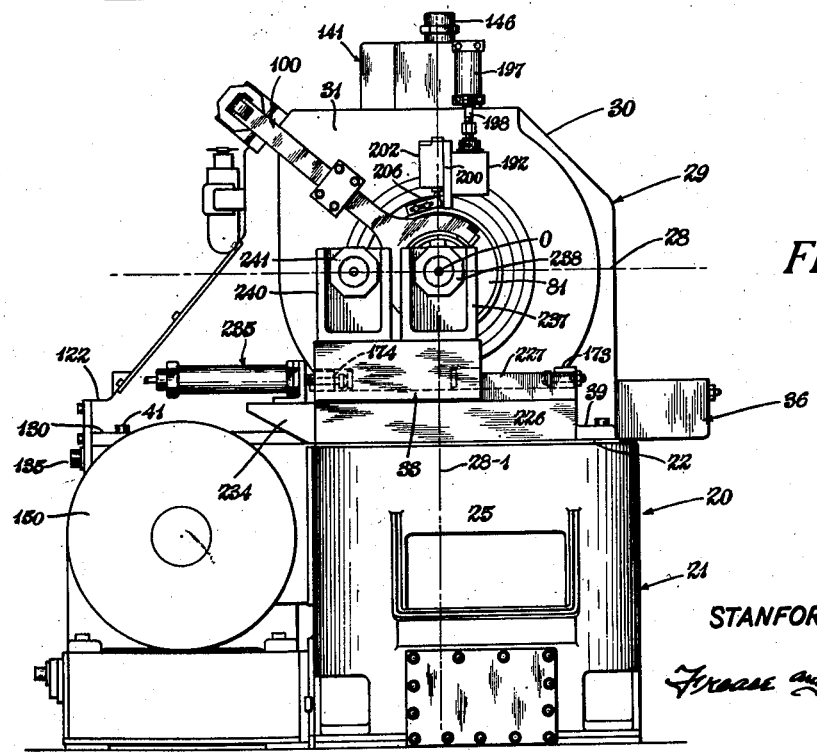
Fig. 6 is an elevational view of the other end of the improved machine tool hereof looking in the direction of the arrows 6—6, Fig. 4.
Figure 8:
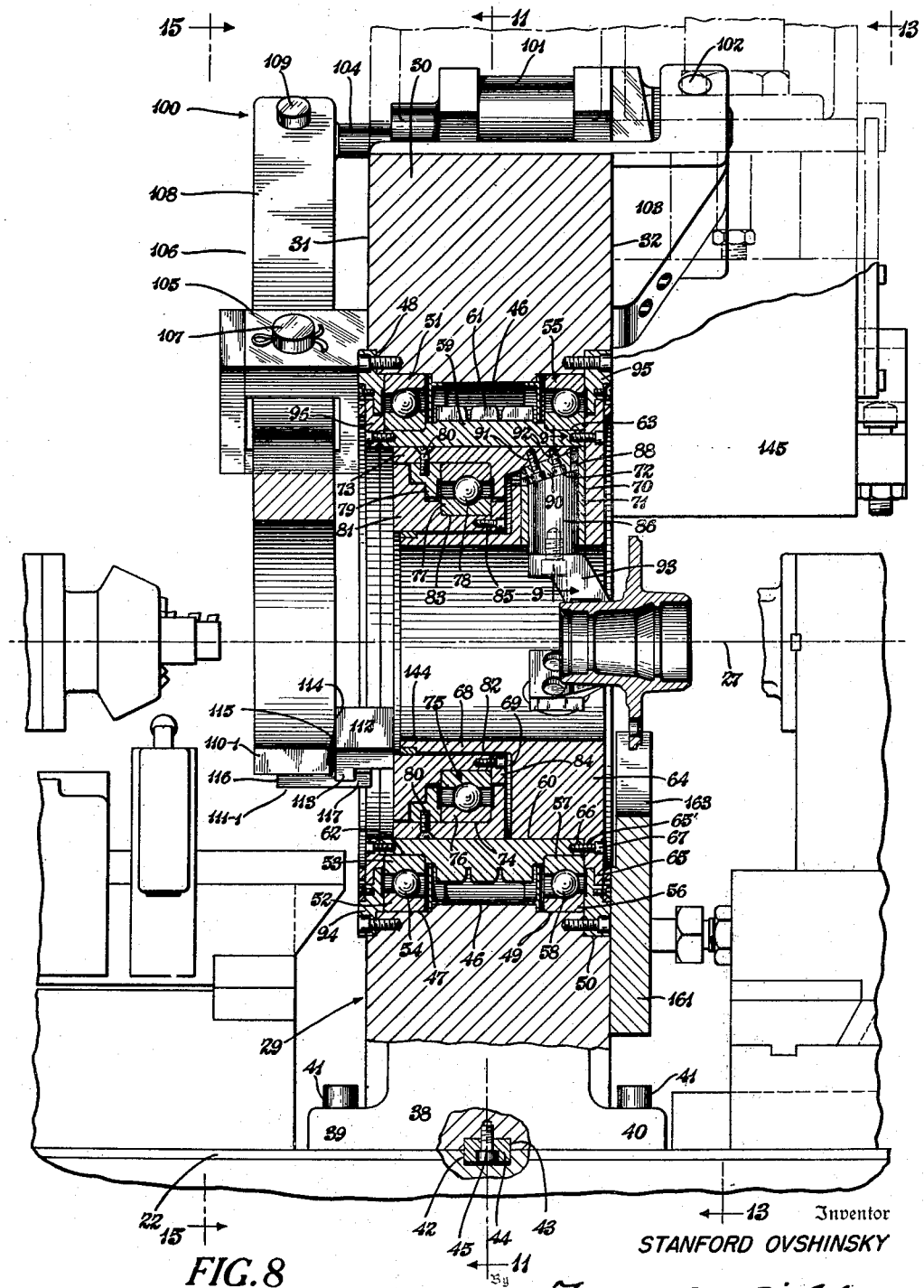
Fig. 8 is an enlarged fragmentary vertical sectional view on a plane passing through the axis of rotation of the rotary parts of the improved chucking unit of the improved machine tool hereof, showing the parts of the chucking unit in their relative positions when mounting or holding a workpiece therein.
Figure 9:
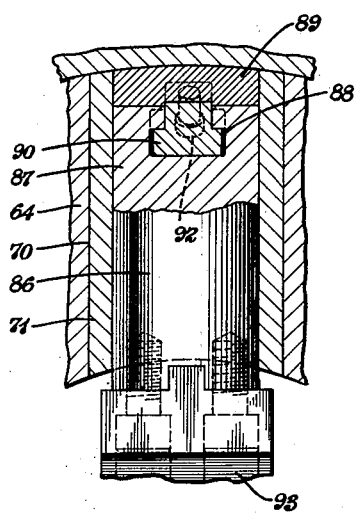
Fig. 9 is an enlarged fragmentary vertical sectional view showing one of the chuck jaws and associated parts as on line 9—9, Fig. 8.
Figure 10:
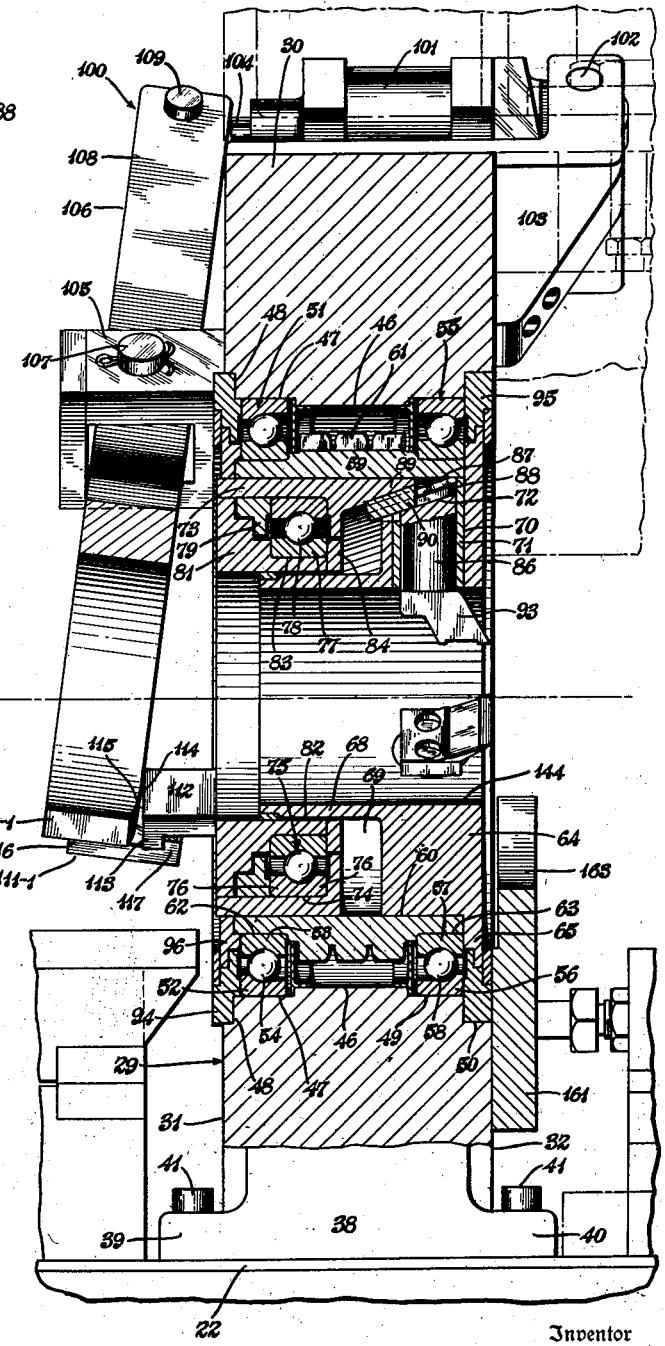
Fig. 10 is a view similar to Fig. 8 showing the parts of the improved chucking unit in their relative positions when the chuck jaws are withdrawn from their extended position permitting unloading or loading of a workpiece in the chuck jaws.

The improved automatic rotary chuck unit 29 is best shown in Figs. 8, 9, and 10, and the chuck unit 29 includes as above stated the housing 30, which is of massive cast iron construction and includes at its lower end 38 transversely extending flange portions 39 and 40 protruding outwardly respectively from the left end and right end faces 31 and 32 of the housing 30. The flanges 39 and 40 have a plurality of apertures formed therein which receive the threaded shanks of cap screws 41 which are screwed into threaded apertures in the bed plate 22.

Preferably as shown in Fig. 8, the top face of the bed plate 22 has formed therein a rectangular keyway 42 and the bottom face of the housing 30 has formed therein a rectangular keyway 43, the keyways 42 and 43 extending transversely and opening toward each other, and there being a key 44 fitting in the keyway 43 and secured to the lower end 38 of the housing 30 by countersunk cap screws 45, the key 44 protruding into and fitting in the keyway 42.

The housing 30 has formed therein a bore 46 which is coaxial with the axis 27 and which has a diameter of substantial magnitude, preferably as shown over twice the width between the end faces 31 and 32, whereby the inner volume of the bore 46 is sufficient to accommodate the parts operatively mounted therein and to provide a through opening for the chuck which is sufficiently large to permit entrance of a turning tool set therein.

The chuck housing bore 46 has formed in its left end an inner bearing seat counterbore 47 and an outer bearing take-up ring seat counterbore 48. Similarly, the chuck housing bore 46 has formed in its right end an inner bearing seat counterbore 49 and an outer bearing take-up ring seat counterbore 50. A ball radial bearing indicated generally by 51 includes an outer raceway ring 52 seated in the left end counterbore 47, an inner raceway ring 53, and balls 54 interposed and rolling between the raceway rings 52 and 53 in a usual manner. Similarly, a ball radial bearing indicated generally by 55 includes an outer raceway ring 56 seated in the right end counterbore 49, an inner raceway ring 57, and balls 58 interposed and rolling between the raceway rings 56 and 57 in a usual manner.

A sprocket sleeve 59 is located in the bore 46 and has an inner bore 60 and outer sprocket teeth 61 which are coaxial with the axis 27, and the sprocket sleeve 59 has an outer left end bearing seat 62 seated in the inner raceway ring 53 of the left end bearing 51. Similarly, the sprocket sleeve 59 has a right end bearing seat 63 seated in the inner raceway ring 57 of the right end bearing 55, whereby the sprocket sleeve 59 is mounted for rotation about the axis 27 in the clutch housing 30.

An annular clutch jaw guide member 64 fits in the right end of the bore of the sprocket sleeve 59 and includes at its outer end a radially outwardly extending securing flange 65 having a plurality of counterbored apertures 65' formed therein and extending over the right end of the sprocket sleeve 59, the apertures in the flange 65 registering with threaded sockets 66 in the right end of the sprocket sleeve 59. Each aperture 65' registers with one of the sockets 66, and a cap screw 67 has its threaded shank extending through the aperture 65' and screwed into the socket 66 in each set of registering aperture 65' and socket 66, whereby rotation of the sprocket sleeve 59 rotates the annular jaw guide member 64 through the drive connections of the cap screws 67.

The annular clutch jaw guide member 64 furthermore includes a tubular portion 68 extending from the left end face of the annular guide member 64 and forming therewith and with the bore of the sprocket sleeve 59 an annular pocket 69 opening to the left.

The annual clutch jaw guide member 64 furthermore has formed therein a plurality of radially extending jaw guide bores 70, which are three in number as shown. In each jaw guide bore 70 there is fitted a bushing 71. At the outer end of each jaw guide bore 70 the annular member 64 has formed therein an outwardly opening slot 72 having a bottom which slopes from the right end of the member 64 towards the left end and towards the axis 27.

The improved chuck unit 29 furthermore includes a jaw moving sleeve 73 having an outer cylindrical surface slidably fitting in the bore 60 of the sprocket sleeve 59. The jaw moving sleeve 73 has formed therein a bearing seat counterbore 74. A rolling thrust bearing indicated generally by 75 includes an outer raceway ring 76 seated in the counterbore 74, an inner raceway ring 77 and balls 78 interposed and rolling between the raceway rings 76 and 77 in a usual manner. A thrust bearing retainer ring 79 is removably secured as by countersunk screws 80 in the sleeve 73 and in abutment with the left end of the thrust bearing outer raceway ring 76.

A non-rotating thrust and bearing mounting sleeve 81 is located with clearance in the left end of the counterbore 74 of the jaw moving sleeve 73, and the sleeve 81 has a bore 82 extending with clearance over the outer cylindrical surface of the tubular portion 68 of the chuck jaw guide member 64. At the right end of the sleeve 81 there is formed a shouldered cylindrical bearing seat 83, on which is seated the inner raceway ring 77 of the ball thrust bearing 75 and on the right end face of the sleeve 81 there is secured a bearing retainer ring 84 as by countersunk cap screws 85. The left end of the sleeve 81 as shown is in the form of an outwardly extending cylindrically stepped flange which mates with clearance with inner cylindrical stepped faces of the outer thrust bearing retainer ring 79.

In the bore of each jaw bushing 71 there is slidably fitted a cylindrical chuck jaw 86 having a sloping outer end 87 in which is formed a sloping T-slot 88 as best shown in Fig. 9. The slope of the outer end 87 and the T-slot 88 of each chuck jaw 86 is from the right end of the chuck housing towards the axis 27 and the left end of the chuck housing. At the right end of the jaw moving sleeve 73 there is provided for each chuck jaw 86 a longitudinally extending tongue 89 which extends into the notch 72 of the jaw guide bore 70 for the particular jaw 86, the tongue 89 extending over the outer sloping end of the jaw 86 and the T-slot 88 therein. Each tongue 89 has an inner slope coinciding and in abutment with the outer slope of its overlapped chuck jaw 86, and a T-shaped jaw return block 90 slidably fits in the T-slot 88 of each chuck jaw 86 and is secured as by cap screws 91 and 92 to the overlapping tongue 89. Accordingly, reciprocation of the sleeve 73 in the direction of the axis 27 effects inward and outward movements of the chuck jaws 86. As shown each chuck jaw 86 has removably secured on its inner end a false jaw 93.

In the left outer bearing take-up ring seat counterbore 48 of the housing 30 there is removably secured a left bearing take-up ring 94 which abuts against the left end of the outer raceway ring 52 of the right ball radial bearing 51. Similarly, in the right outer bearing take-up ring seat counterbore 50 of the housing 30 there is removably secured a right bearing take-up ring 95 abutting the right end of the outer raceway ring 57 of the right ball radial bearing 55. On the left end of the sprocket sleeve 59 there is removably secured an inner bearing retainer ring 96, having a right end face abutting and retaining the left end of the inner raceway ring 53 of the left bearing 51. The flange 65 of the jaw guide member 64 extends radially beyond the outer cylindrical surface of the right end bearing seat 63, and the flange 65 has a left end face abutting and retaining the right end of the inner raceway ring 57 of the right ball radial bearing 55.

Power means indicated generally by 100 are provided for applying pressure upon or reciprocating the non-rotating thrust sleeve 81, and thereby applying pressure upon or reciprocating the rotary chuck moving sleeve 73. As shown, the power means 100 includes a reciprocating motor 101 having at its right end a pivotal connection 102 with a mounting block 103 secured on the right end face 32 of the housing 30. The motor 101 includes a power-operated reciprocating rod 104 extending beyond the left end face 31 of the housing 30.

Intermediate the housing bore 46 and the rod 104, there is secured on the left end face 31 of the housing 30 a pivot block 105, and a yoke lever 106 has a pivot mounting 107 on the pivot block 105 and includes an outer arm 108 extending away from the bore 46 and having a pivotal connection 109 with the rod 104. The yoke lever 106 furthermore includes spaced yoke arms 110-1 and 110-2 extending crosswise of the outer end face of the thrust sleeve 81 at opposite sides of the axis 27. The yoke arm 110-1 has a push and pull connection 111-1 with the thrust sleeve 81, and the yoke arm 110-2 has a push and pull connection 111-2 with the thrust sleeve 81. The push and pull connections 111-1 and 111-2 are similar, and each includes a push and pull block 112 secured to the outer or right end of the thrust sleeve 81 and including a radially extending pull flange 113 at its outer end and an outer thrust end face 114. The outer end of the yoke arm 110-1 has on its inner or right face a curved portion 115 abutting the thrust face 114 of the block 112. A pull hook 116 is secured on the outer end of the yoke arm 110-1 and includes a hook end 117 which is hooked beneath the flange 113. Accordingly, when the rod 104 is urged outwardly away from the left end face 31 of the housing 30, thrust is applied by the yoke arms 110-1 and 110-2 on the diametrically opposite blocks 112 mounted on the thrust sleeve 81 serving to push or urge the thrust jaws 86 radially inwardly. Reverse movement of the rod 104 pulls the thrust jaws 86 radially outwardly.

The push and pull connections 111-1 and 111-2, as above described, also hold the thrust sleeve 81 against rotation.

Figure 11:
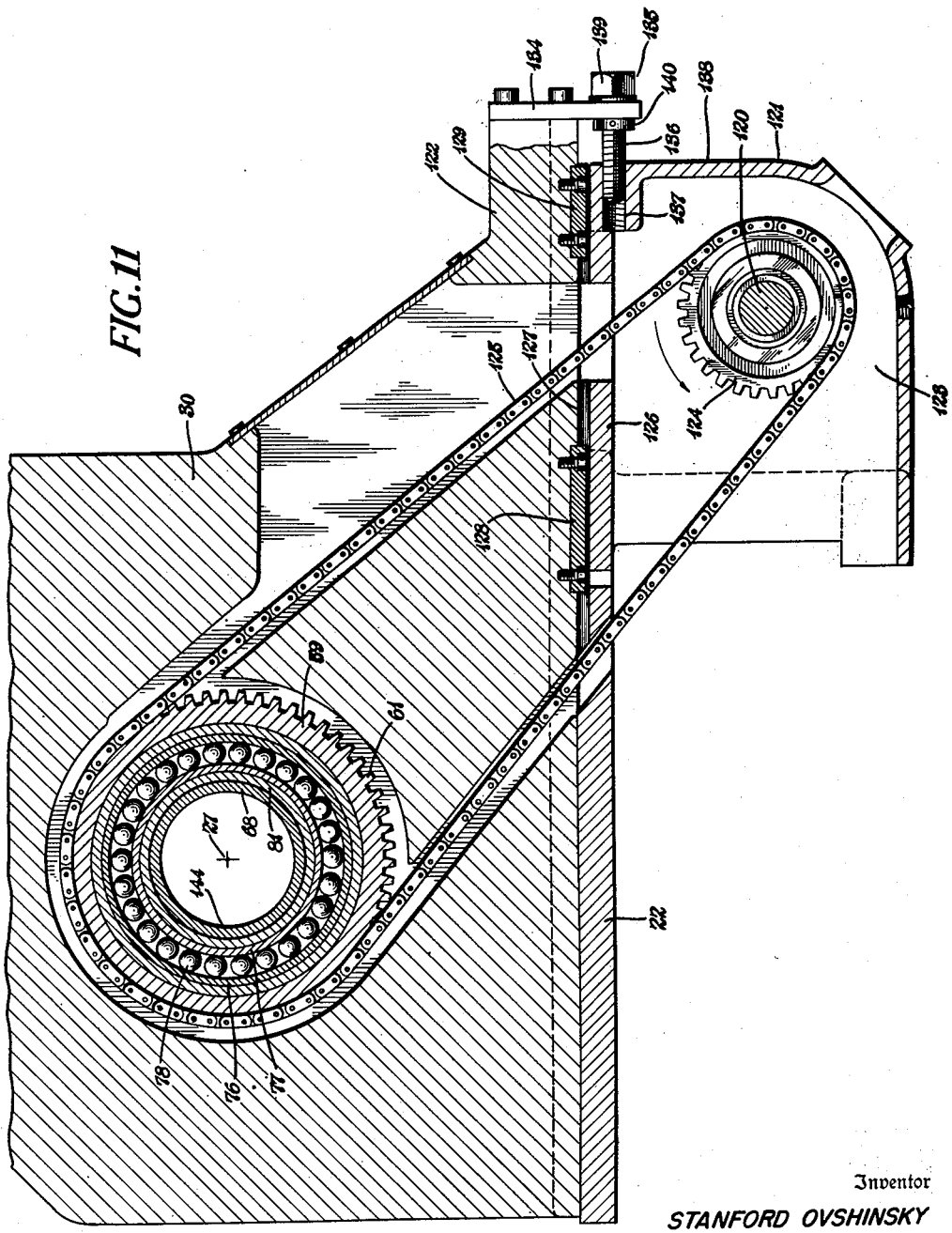
Fig. 11 is a fragmentary transverse sectional view as on line 11—11, Fig. 8, showing the rotary drive for the chuck unit.
Figure 12:
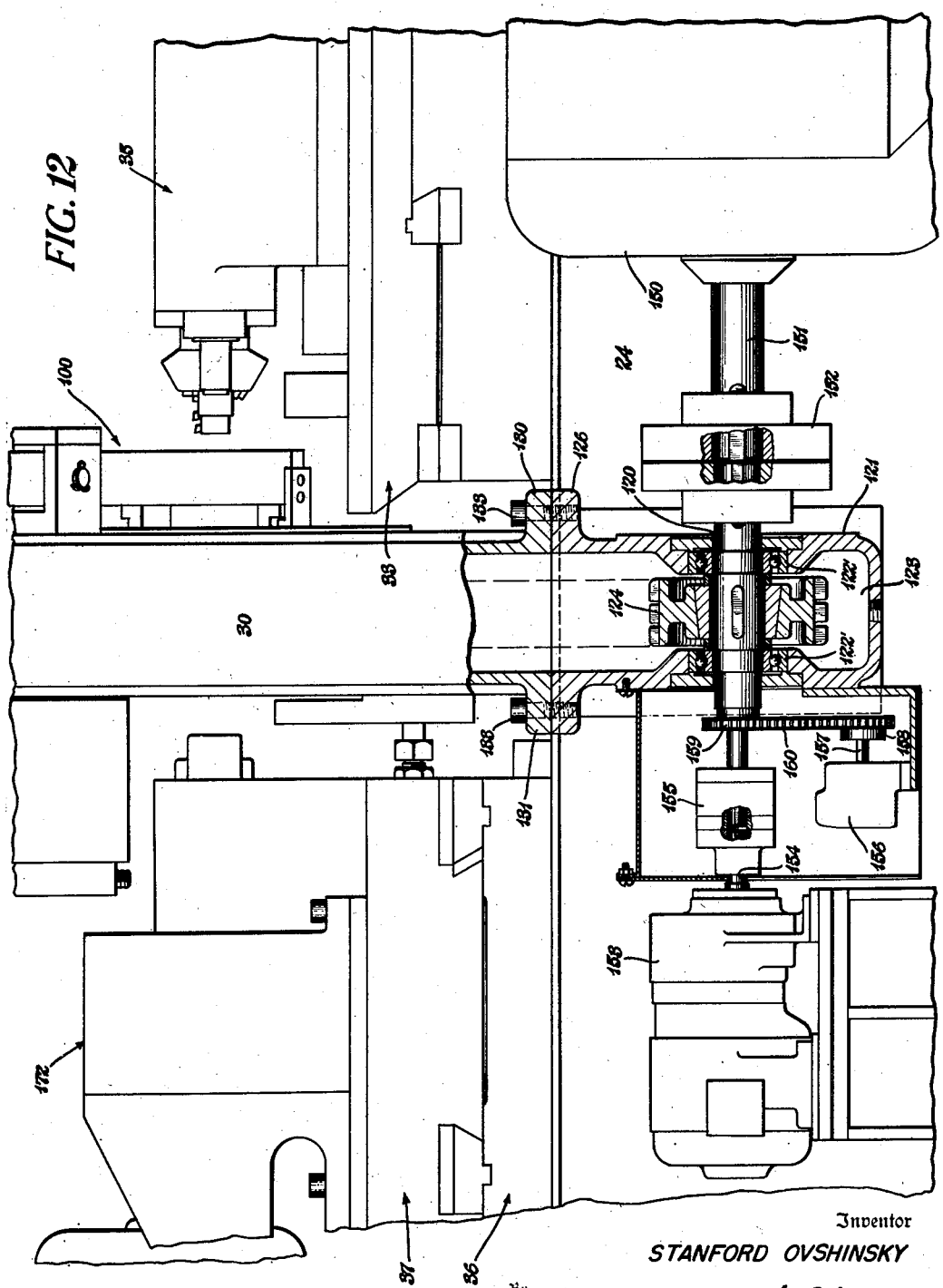
Fig. 12 is a fragmentary rear elevational view with portions in section showing other parts of the rotary drive for the chuck unit, and associated mechanisms.
Figure 13:
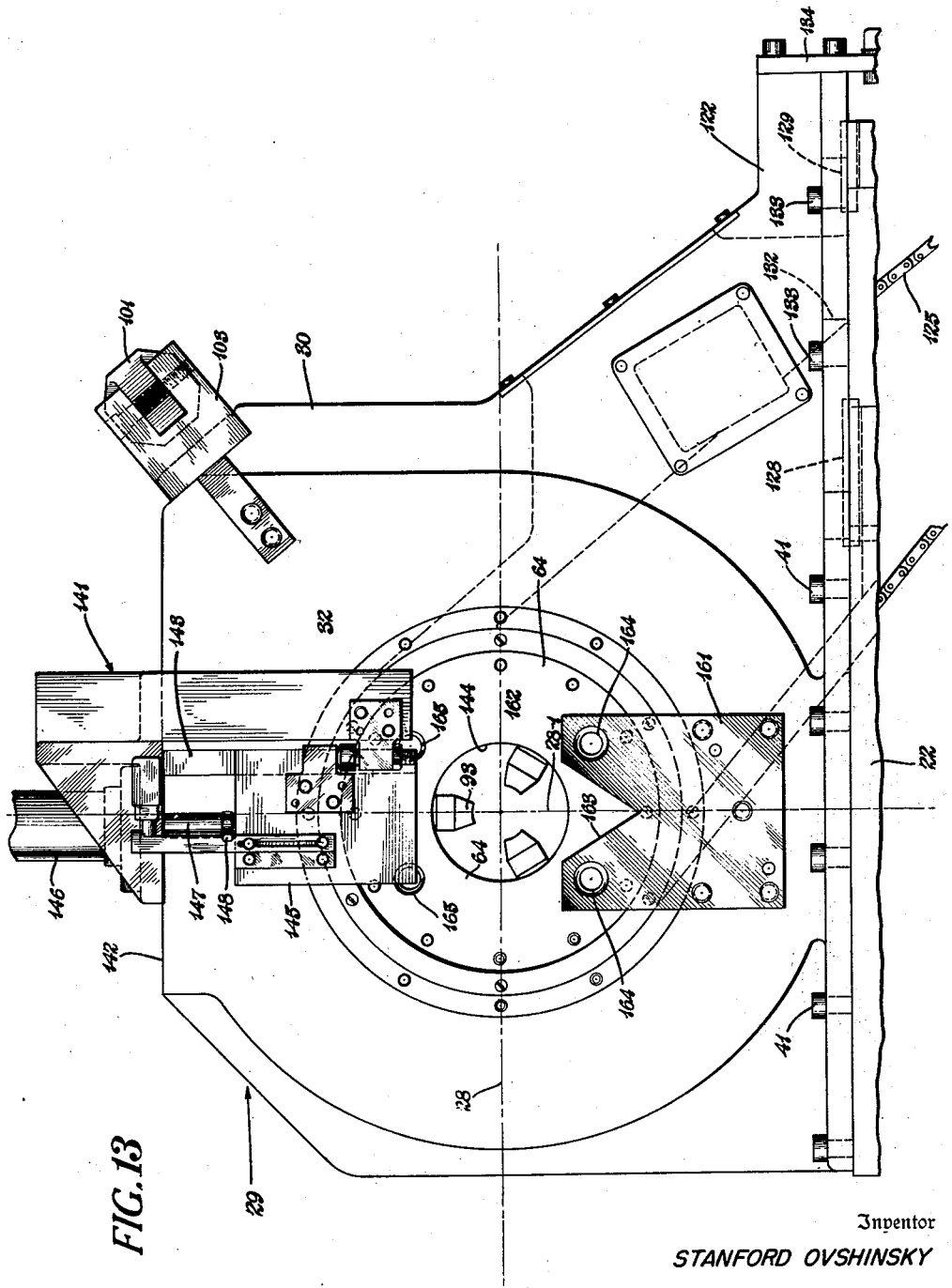
Fig. 13 is a fragmentary transverse view looking in the direction of the arrows 13—13, Fig. 8, and showing in elevation the loading end of the chuck and parts and mechanisms associated therewith.

As best shown in Figs. 11, 12, and 13, the rotary drive for the chuck unit 29 is of improved construction and includes a drive shaft 120 located at the rear of the rear side wall 24 of the base 21 and below the top bed plate 22. A housing 121 is suspended from a rear extension 122 of the chuck housing 30 at the rear of the base rear side wall 24. The axis of the shaft 120 is parallel with the chuck axis of rotation 27, and the shaft 120 extends through end openings in the housing 121 and is rotatably mounted therein by longitudinally spaced ball bearings 122'. In the compartment 123 of the housing 121 there is keyed upon the shaft 120 a drive sprocket 124, and an endless chain belt 125 extends around and fits on the teeth of the drive sprocket 124 and the teeth of the sprocket sleeve 59 of the chuck. The housing 121 includes an upper wall 126 having formed therein an upwardly opening keyway 127 which extends in the direction of the axis 28, and keys 128 and 129 depend from the bottom of the chuck housing extension 122 and fit in the keyway 127.

The chuck housing extension 122 includes at its bottom longitudinally spaced transversely extending flanges 130 and 131, as best shown in Fig. 3. The flanges 130 and 131 have formed therein elongated slots 132 through each of which extends the shank of a cap screw 133 the threaded end of which is screwed into the top wall 126 of the housing 121 whereby the housing 121 and the shaft 120 and sprocket 124 are movable towards and away from the vertical plane including the chuck axis of rotation 27 for adjusting the tension on the chain belt 125.

Means are provided for locking the housing 121 at any desired adjusted transverse position, which as best shown in Fig. 11 includes a set screw journalling bar 134 depending from the rear end face of the chuck housing extension 122, and a set screw 135 is journalled in the lower end of the bar 134, and the threaded shank 136 of the set screw is screwed into a threaded bore 137 extending transversely in the rear wall 138 of the housing 121. The set screw 135 has a head 139 on the outside of the bar 134 and a collar 140 is located and secured on the shank 136 of the set screw 135 in abutment with the inside face of the bar 134, whereby rotation of the set screw 135 serves to move the housing 121 transversely of the chuck housing 30 when the cap screws 133 are loosened.

A main drive motor 150 includes a shaft 151 aligned with one end of the shaft 120 and having a connection therewith by means of a coupling 152. A torque or gear head motor 153 has a shaft 154 aligned with the other end of the shaft 120 and connected therewith by an overrunning clutch coupling 155. A plugging switch relay 156 has a shaft 157 on which is secured a sprocket 158. The shaft 157 is parallel with the shaft 120, and a sprocket 159 on the shaft 120 is aligned with the sprocket 158, and an endless chain belt 160 extends around the sprockets 158 and 159.

As best shown in Fig. 13, the improved machine tool 20 furthermore includes a vertical slideway and motor mounting bracket indicated generally by 141 which is secured on the horizontal top face 142 of the chuck housing 30. The bracket 141 includes vertical dovetail guideways 143 extending downwardly towards the chuck opening 144 and crosswise of the chuck housing right end face 32. A tool holder block 145 is vertically slidable on the ways 143 in the vertical plane including the vertical axis 28-1, and power means are provided for reciprocating the tool holder block 145, which as shown includes a reciprocating motor 146 mounted on the upper end of the bracket 141 and including a vertically reciprocating rod 147 having a connection 148 at its lower end with the upper end of the tool holder block 145.

Also, as best shown in Fig. 13 for a purpose hereinafter described, there is secured on the chuck housing right end face 32 below the chuck opening 144 a guide plate 161 which is symmetrical with respect to the axis 28-1 and extends upwardly across the outer end face 162 of the jaw guide member 64. The plate 161 has an upwardly opening V-notch 163 formed in its upper end, and the apex of the notch is in the vertical plane containing the axes 27 and 28-1, and equally spaced on opposite sides of the vertical plane containing the axes 27 and 28-1 there is formed in the upper end of the plate 161 two guide holes 164 each having a tapered countersunk outer end.

The outer end of the guide member 64 has formed therein a pair of cylindrical sockets 165 having tapered countersunk outer ends and located for registration with the holes 164.

On the top of the cross slide 37 and at its front left corner, there are mounted side by side tool holder blocks 170 and 171. Also, on the top of the cross slide 37 at the rear side thereof there is mounted a drill and reamer unit indicated generally by 172. (Figs. 1, 3, 14, 18 through 21, and 23.)

The transverse movements of the cross slide 33 (Figs. 3 and 6) are limited by a front stop 173 and by a rear stop 174. The transverse movements of the cross slide 37 (Fig. 14) are limited by a front stop 175 and by a rear stop 176. Intermediate index stops for the cross slide 37 are provided by means best shown in Fig. 14, and which include an index stop block 177 secured in a recess on the underside of the cross slide 37 above the top of the saddle or carriage 36. The bed plate 22 has formed therein a longitudinally extending slot 178, and the saddle 36 has formed therein a vertical bore 179 lined with a bushing 180, and a plunger 181 having an upper tapered and preferably square indexing head 182 fits and is slidable in the bushing 180. The indexing block 177 has formed therein laterally spaced downwardly opening tapered sockets 183 and 184 adapted to be registered with and to receive the tapered indexing head 182. Up and down movements of the plunger 181 and its tapered indexing head 182 are effected by means of a reciprocating motor 185 including a reciprocating rod 186 having an upper end connected with the lower end of the plunger 181.

The improved machine tool 20 furthermore includes improved positive stop and positioning means for the rotary parts of the chuck unit 29. The mechanical parts and certain of the electrical parts of the positive chuck stop and positioning means are best shown in Figs. 15 and 17 and are indicated generally by 190, and these parts are operatively associated with the rotary drive for the chuck unit 29 as best shown in Fig. 12.

The parts of the positive chuck stop and positioning means shown in Figs. 15 and 17 and indicated generally by 190, include a vertically extending guide or saddle 191 which preferably is in the form of a T bar, the base of the stem of which is secured upon the left end face 31 of the chuck housing 30. Mounted for vertical reciprocation on the guide 191 is a slide 192 which is formed with a longitudinally extending slot having a transverse T cross section and which is slidably fitted on the T bar guide 191, preferably by means of a gib. A connector bolt 193 has a threaded shank 194 which is screwed in a threaded socket in the upper end of the slide 192, and a threaded cylindrical stop nut 195 is screwed upon the shank 194 of the connector bolt 193 and is positioned thereon by the use of a set screw and an additional jamb nut.

The bracket 141 on the top face 142 of the chuck housing 30 has a left end vertical face 196 on which is secured a reciprocating motor unit indicated generally by 197 and including a depending reciprocating rod 198 which is vertically aligned with the connector bolt 193, the lower threaded end of the rod 198 being screwed into a threaded socket in the head of the bolt 193.

The guide 191, the slide 192, and the motor unit 197 are located at the front of the vertical plane including the line 28 and the axis of rotation of the rotary parts of the chuck unit 29. The slide 192 has a rear vertical face 199 on which is secured a chuck stop and positioning bar 200 having a lower end 201 depending below the lower end of the slide 192. On the rear vertical face of the bar 200 there is secured a limit switch unit indicated generally by 202 and which includes a housing 203 from the lower end of which depends a reciprocating plunger 204. Rotatably mounted on the lower end of the plunger 204 is a roller 205.

As previously set forth, the rotary parts of the chuck include a ring 96 secured on the left end of the sprocket sleeve 59, and on the outer left end face of the ring 96 there is adjustably secured a stop and cam block 206 having an advancing end 207 with a stop face 208, and angular thereto a cam face 209.

As shown in Figs. 15 and 17 the slide 192 and the parts attached thereto are in their lowermost position, further downward movement being prevented by abutment of the stop nut 195 with the upper end of the guide 191. In this position the lower end 201 of the bar 200 is located in the path of the advancing end 207 of the block 206. As hereinafter described in greater detail, the motor 197 is actuated by movements of other parts of the machine tool 20 at a desired time to lower the slide 192 and attached parts.

Such actuation occurs after the plugging switch motor 156 has been operated to stop the main motor 150. Momentum of the rotating parts of the main motor 150 and the chuck unit 29 are sufficient to cause a partial rotation of these parts in the direction of the arrow 210 as shown in Fig. 15, until the stop face 208 of the block 206 abuts against the rear face of the lower end 201 of the bar 200 which is at a desired stationary and non-rotating position of the rotatable parts of the chuck.

If for any reason there is a slight reverse rotation of the rotary parts of the chuck, the top corner of the cam face 209 of the block 206 operating against the roller 205 of the limit switch 202 raises the plunger 204, and through usual electrical connections energizes the torque motor 153 which thence rotates the shaft 151 until the block 206 again abuts the bar 200 when the motor 153 is de-energized. The rotary parts of the chuck 29 are thus stopped and positioned with only a slight oscillatory movement thereof in the short arc between the rear face of the bar 200 and the adjacent roller 205.

Describing now in detail the drill and reamer unit indicated generally by 172, as best shown in Figs. 3, 4, 5, and 14, the drill and reamer unit 172 includes a mounting frame indicated generally by 211 and having a bottom wall 212 secured on the top of the cross slide 37. A transverse vertical wall 213 extends upwardly from the left end of the bottom wall 212, and from the front and rear ends of the transverse wall 213 triangular front and rear walls 214 and 215 extend and taper downwardly to the right and are joined at their bottoms with the front and rear borders of the bottom wall 212, thus forming a compartment 216 in which is mounted on the bottom wall 212 a rotary electric motor 217 having a rotary shaft 218 whose axis is parallel with the chuck axis of rotation 27.

Figure 14:
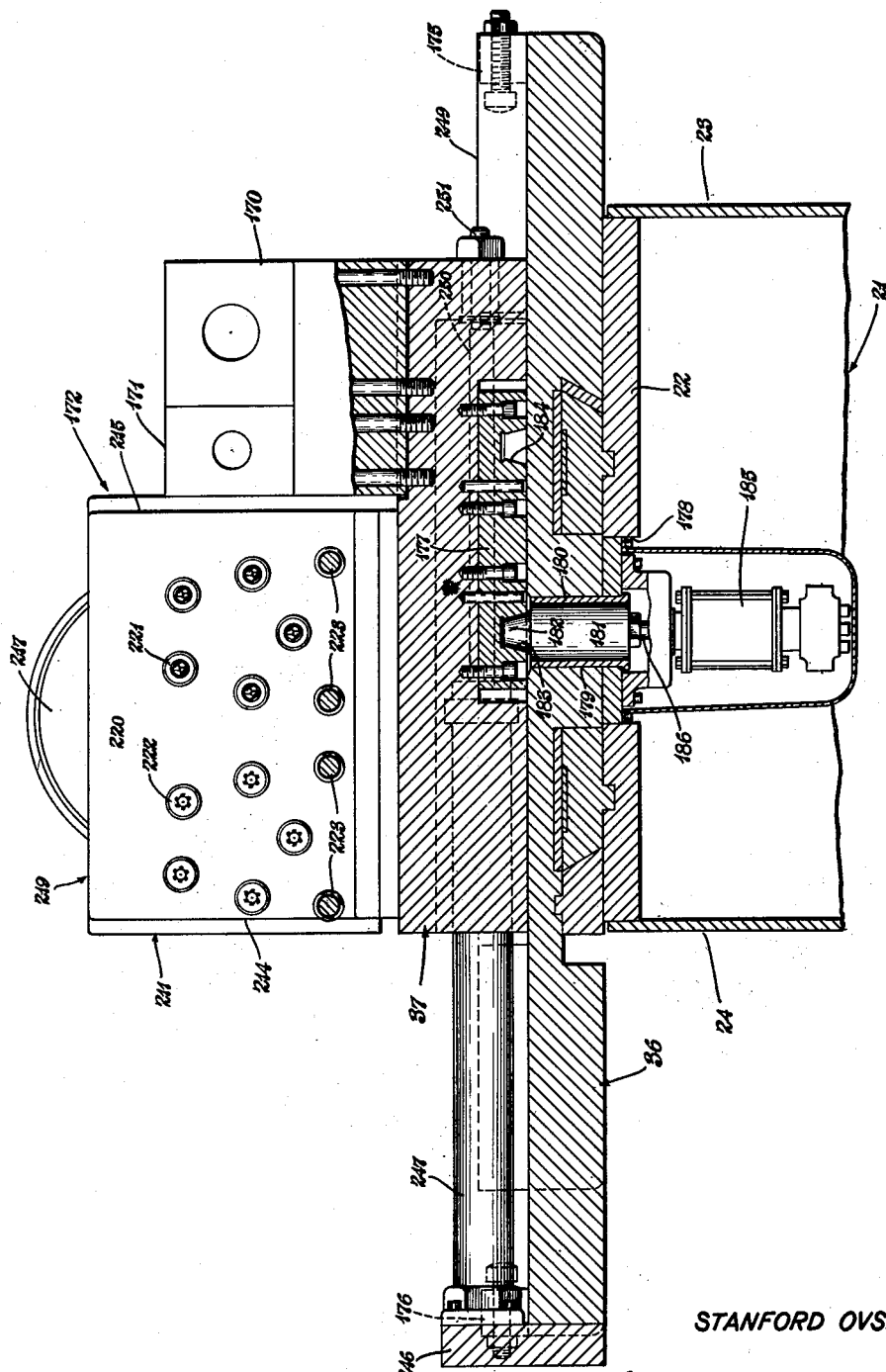
Fig. 14 is a fragmentary transverse sectional view as on line 14—14, Fig. 4, showing details of improved indexing apparatus for one of the cross slides of the improved machine tool hereof.

At the left side of the wall 213 of the mounting frame 211 and in abutment therewith and on the bottom wall 212 there is mounted a double cluster multiple spindle unit indicated generally by 219 including a rectangular housing 220 in which is operatively mounted in a usual manner two multiple spindle clusters of five each, one cluster at the front of the housing including drill spindles 221, and the other cluster at the rear of the housing including reamer spindles 222 as best shown in Fig. 14. Within the housing 220 each spindle of each set is gear driven in a usual manner through a chain of gears which has a drive connection with the motor shaft 218.

As best shown in Fig. 4, from the left wall of the housing 220 there extend lower aligning rods 223, each having a forward end adapted to be inserted in one of the apertures 164 of the guide plate 161 as shown in Fig. 13.

When the rotary parts of the chuck have been stopped by the operation of the positive stop and positioning means, each of the cylindrical sockets 165 of the jaw guide member 64 is aligned with one of the holes 164 of the guide plate 161 and the outer end of one of the aligning rods 223 is adapted to extend into each set of aligned hole 164 and socket 165. There are two rods 223 for each cluster of spindles 221 and 222.

Preferably, there is slidably mounted on each pair of rods 223 a bumper and steady rest 224, and between each bumper and steady rest 224 and the left wall of the housing 220 there is interposed on each rod 223 a helical spring 225. Each bumper 224 extends upwardly from its set of supporting rods 223 and is provided with steady rest guide apertures aligned with the spindles with which it is associated. The spindles 221 have mounted therein when the machine is in use combined drills and countersinks, each of which extends through one of the steady rest guide apertures in its associated bumper 224. Similarly, when the machine tool is in use, the spindles 222 each mount a reamer which extends through one of the steady rest guide apertures in its associated bumper.

As previously stated, the several movements respectively of the cross slide 33, the tool holder blocks 34 and 35, the saddle 36, and the cross slide 37 are independently effected by means of separate reciprocating motors, as shown in Figs. 1, 3, 4, 5, 6, and 14.

The mounting of the cross slide 33 for transverse movement on the top of the bed plate 22 is provided by means of a stationary guide plate 226 which is secured on the top of the bed plate 22 and which is formed with an upwardly protruding transversely extending dovetail tongue 227. The cross slide 33 is formed on its underside with a transversely extending dovetail groove which fits on the dovetail tongue of the guide plate 226. As shown, a plurality of sets of transversely extending flat slide bearings 228 and 229 are interposed between the cross slide 33 and the guide plate 226, and the dovetail groove and the cross slide 33 are preferably formed by gibs 230 and 231 sliding respectively on transversely extending slide bearing bars 232 and 233 located in the upper surface of the guide plate 226.

A mounting bracket 234 is secured upon the rear side of the plate 226, and a reciprocating motor indicated generally by 235 is mounted on the top of the mounting bracket 234 and includes a reciprocating rod 236 which moves in a direction parallel with the plane Y, and which has a front end connected with the cross slide 33.

Each of the tool holder blocks 34 and 35 is mounted for independent longitudinal movement parallel with each other and with the axis 27 on the top of the cross slide 33, as aforesaid. The mounting is effected preferably by means of inter-fitting longitudinally extending dovetail tongue and groove slide bearing sets.

At the left end of the cross slide 33 and spaced from the left end of the tool holder block 34, there is secured on the top of the cross slide 33 a mounting bracket 237, and a reciprocating motor indicated generally by 238 is mounted on the top of the mounting bracket 237 and includes a reciprocating rod 239 which extends from the right end of the motor 238, and moves in a direction parallel with the axis 27, and has a right outer end connected with the tool holder block 34.

Likewise, at the left end of the cross slide 33 and spaced from the left end of the tool holder block 35, there is secured on top of the cross slide 33 a mounting bracket 240, and a reciprocating motor indicated generally by 241 is mounted on top of the mounting bracket 240 and includes a reciprocating rod 242 which extends from the right end of the motor 241 and moves in a direction parallel with the axis 27, and has a right outer end connected with the tool holder block 35.

The carriage or saddle 36 is operatively mounted for longitudinal movement parallel with the axis 27 on the top of the bed plate 22, as aforesaid. This mounting is also effected preferably by means of inter-fitting longitudinally extending dovetail tongue and groove slide bearing sets. On the right end wall 26 of the base 21 there is secured a mounting bracket 243, and a reciprocating motor indicated generally by 244 is mounted on the top of the mounting bracket 243 and includes a reciprocating rod 245 which extends from the left end of the motor 244, and moves in a direction parallel with the axis 27 and has a left outer end connected with the right end of the saddle 36.

The cross slide 37 is operatively mounted for transverse movement parallel with the plane Y on top of the saddle 36, as aforesaid. This mounting is similarly effected preferably by means of inter-fitting transversely extending dovetail tongue and groove slide bearing sets.

On the rear side of the carriage or saddle 36 there is secured a bracket 246 extending vertically above the upper face of the saddle 36. A reciprocating motor indicated generally by 247 extends transversely between the transversely extending dovetail groove forming bars 248 and 249 on the upper face of the saddle 36, as best shown in Figs. 3 and 14. The reciprocating motor 247 includes a reciprocating rod 250 which extends from the front end of the motor 247 and has a front end 251 connected with the front end of the cross slide 37.

From a very broad standpoint, each of the reciprocating motors of the machine tool 20 might include a reciprocating rod actuated through a worm wheel and worm, or a rack and pinion gearing by a rotary electric motor. However, such a reciprocating motor would not be able to attain the more specific and ultimate objects of the present invention or discovery which include the high speed production of the finished holded annular flanged hubs substantially free from tooling or chatter marks, and ready for use.

For the purpose of attaining such specific ultimate objects of the present invention or discovery, each of the reciprocating motors of the illustrated machine tool 20 is a double-acting fluid operated reciprocating motor including a cylinder in which a piston reciprocates between opposite cylinder heads, and the reciprocating rod of the motor extends through a seal opening in one of the cylinder heads and has an inner end connected with the piston.

The piston forms cylinder chambers in the cylinder between each of its faces and the opposite cylinder head, and fluid under pressure is alternately pumped into and out of the opposite cylinder chambers, thereby moving the piston and piston rod.

In such fluid operated reciprocating motors when the fluid is liquid such as oil or a mixture of oils and other liquids, the motors are used in systems which are known in industry as hydraulic systems, and standards have been adopted in industry which define such motors as cylinders. From the standpoint of industrial terminology when such a cylinder is operated by a liquid under pressure, it is known as a hydraulic cylinder, and when it is operated by air under pressure, it is known as an air cylinder.

In the illustrated machine tool 20, using the industrial terminology, the chuck positive stop motor 197 is an air cylinder, and the right cross slide index motor 195 likewise is an air cylinder. Each of the other reciprocating motors is a hydraulic cylinder.

The improved machine tool 20 hereof both for manual and semi-automatic operation is provided, in addition to the motors heretofore indicated, with other motors, and with other electrical equipment including control equipment. The diagrammatic views Figs. 25-A and 25-B illustrate the layout of the electrical equipment incorporated in and associated with the improved machine tool 20, and the graphical symbols used in Figs. 25-A and 25-B are substantially those included in American Standard Graphical Symbols for Electric Power and Control, ASA Z 32.3—1946, approved by American Standard Association, March 1, 1946.

It is specifically noted with respect to contacts that the character "NO" means normally opened for the normal position of the contacts, and the character "NC" means normally closed for the normal position of the contacts. Furthermore, it is noted that in the previous description of the mechanical association of the parts of the machine tool 20, the motors have been given numerical reference characters whereas in Figs. 25-A and 25-B for convenience the motors are given letter and number reference characters "M-1" etc. The following shows the identity of the motor reference characters of the diagrammatic views 25-A and 25-B and the numerical reference characters for the motors used in the foregoing mechanical description, and also the numerical reference character 149 for the motor illustrated in the diagrammatic view, Fig. 24, showing the layout of the hydraulic equipment incorporated and associated with the improved machine tool 20, and further described hereinafter:

| Diagram Reference Character | Mechanical Description Reference Character |
|---|---|
| M-1 | 150 |
| M-2 | 217 |
| M-3 | 149 |
| M-4 | 153 |

The operations of the limit switches of the improved machine tool 20 are set forth in the following table:

*Limit switch operations*

| Reference Character | Normal Position of Contacts | |
|---|---|---|
| LS-1 | NO—IO | Operated By Chuck Close—Holding. |
| LS-2 | NO—IO | Operated By Top Slide Forward Stroke—Momentary. |
| LS-3 | NO—IO | Operated By Left Rough Forward Stroke. |
| LS-4 | NO—IO | Operated By Right Rough Forward Stroke. |
| LS-5 | NO—IO | Operated By Right Rough Back Stroke—Momentary Pass Over. |
| LS-11 | NO—IO | Operated By Right Finish Back Stroke—Momentary Pass Over. |
| LS-13 | NO—IO | Operated By Right Drill Back Stroke—Momentary Pass Over. |
| LS-14 | NO—IO | Operated By Right Ream Back Stroke—Momentary Pass Over. |
| | NC—IC | |
| LS-6 | NO—IC | Operated By Left Rough Back Stroke—Hold. |
| LS-10 | NO—IC | Operated By Left Finish Back Stroke—Hold. |
| LS-9 | NO—IO | Operated By Left Finish Forward Stroke—Momentary. |
| LS-8 | NO—IO | Operated By Left Cross Forward Stroke—Hold. |
| | NC—IC | |
| LS-7 | NO—IO | Operated By Right Cross Forward Stroke—Hold—Stations 2 and 4. |
| LS-7A | NO—IO | Operated By Right Cross Forward Stroke—Hold—Station 3. |
| LS-12 | NO—IO | Operated By Chuck Locating Stop—Hold. |

As aforesaid, the right cross slide 37 has mounted thereon a side by side front tool holder block 170 intermediate tool holder block 171 and the rear drill and reamer unit 172.

Referring to Figs. 18 to 22, inclusive, the tool holder block 170 mounts roughing tools indicated generally by 252. The intermediate tool holder block 171 mounts finishing tools indicated generally by 253. Each drill spindle 221 mounts a drill 254, and each reamer spindle 222 mounts a reamer 255. The carriage, saddle, or longitudinal slide 36 may be said to move forward towards the chuck unit 229 and back therefrom, the forward movement constituting a feeding movement for the tool setup.

The right cross slide 37 is positioned by the operation of the machine tool 20 at four stations shown respectively as follows: station 1, Fig. 18; station 2, Fig. 19; station 3, Fig. 20; station 4, Fig. 21.

At station 1 a rough turning operation is performed; at station 2 a finish turning operation is performed; at station 3 a drilling operation is performed; and at station 4 a reaming operation is performed.

After the drilling operation is performed at station 3 and before the saddle or slide 36 is backed, the rotation of the drill 254 is reversed, and similarly after the reaming operation is performed, and before the saddle or slide 36 is backed, the rotation of the reamer 255 is reversed.

Referring now to Figs. 22 and 23, Fig. 22 shows the relative position of the tools after the finish of all operations at station 1, and Fig. 23 shows the relative position of the tools during the finishing operations at station 2. The tool holder block 34 on the left cross slide 33 mounts roughing tools indicated generally by 256, and best shown in Fig. 22. The tool holder block 35 mounts finishing tools indicated generally by 257, best shown in Fig. 23. The movements of the left carriage 33 towards and away from the chuck unit 29 may be described as forward and backward movements, the forward movement being a feeding movement.

In Figs. 22 and 23 the tool holder blocks 34 and 35 and the tools mounted therein are shown respectively in forward positions after a feeding movement. Likewise, the tool holder blocks 170 and 171 and the tools mounted therein are shown respectively in forward positions after feeding movement. The tools in tool holder blocks 34 and 35 perform turning operations.

The vertically slidable tool holder block 145, as shown in Fig. 22, mounts facing tools indicated generally by 258. These facing tools perform a facing operation at station 1.

Fig. 2 is a perspective view of the finished hub indicated generally by 259 for which the improved machine tool 20 as shown is set up to machine, and Fig. 7 is a side elevation of the hub 259. The hub 259 includes a cylindrical sleeve portion 260 intermediate the ends of which is located a radially outwardly extending annular flange 261, and the annular flange 261 has formed therein a plurality of holes 262 equally spaced from each other circumferentially.

The hub 259 constitutes broadly a metal article including a sleeve and a holed annular flange extending radially outwardly from the sleeve. The hub 259 must be machined to an accuracy of plus or minus .001 inch.

At station 1 the following turning operations are performed while the rough hub workpiece 259' is held without slipping in the jaws of the rotary chuck unit 29 and the jaws and other rotating parts are rotated:

(1) Rough bore and counterbore workpiece sleeve 260' at each end;
(2) Face and chamfer sleeve 260' at each end;
(3) Turn periphery of workpiece flange 261';
(4) Face and shoulder opposite sides of flange 261'.

At station 2, likewise while the rough turned workpiece 259' is being rotated, the following turning operation is performed:

(5) Finish bore and counterbore sleeve 260' at each end.

The chuck jaws and the finish turned workpiece 259' held therein, and the other rotary parts of the chuck unit 29 are then positively stopped and maintained in an indexed position by operation of the improved positive stop and positioning means for the rotary parts of the chuck unit 29, after which at station 3 the following holing operation is performed:

(6) Drill and chamfer holes in flange 261'.

After the drilling and chamfering operation is performed at station 3, at station 4 the following operation is performed:

(7) Ream holes in flange 261'.

Fig. 24 is a diagrammatic view showing the layout of the hydraulic equipment incorporated and associated with the improved machine tool 20.

The graphical symbols used in Fig. 24 are substantially those contained in the publication entitled "J. I. C. Hydraulic Standards for Industrial Equipment," published as of September 1948, after being compiled by the Joint Industry Conference.

Each of the hydraulic cylinders shown in Fig. 24 is given the general numerical reference character previously used herein. The solenoid actuators for the control valves for the cylinders are given alphabetical reference characters A to N, inclusive, which conform to similar reference characters used in Figs. 25–A and 25–B.

Referring to Figs. 25–A and 25–B which are complementary diagrammatic views showing the layout of the electrical equipment incorporated in and associated with the improved machine tool hereof, the sequence of operations of the improved machine tool 20 when semi-automatic operations are utilized is set forth in the following outline:

*Sequence of operations—semi-automatic*

1. Start hydraulic motor
2. Start drill motor
3. Close chuck. CR–1 (de-energize chuck open circuit)
   3.1 Right cross energized by CR–19 against stop
   3.2 Lock pin down by CR–18A
4. Start cycle
   4.1 Index stop (chuck) up. CR–10→release CR–17
   4.2 CR–17 de-energize and TD–1 energize CR–3
      4.2.1 Left rough forward
      4.2.2 Right rough forward
      4.2.3 Face forward (down)
      4.2.4 Main drive start (CR–4, M–1F and plug switch hold)
      4.2.5 Left rough reverse
            LS–3, CR–6
      4.2.6 Right rough reverse  De-energize CR–10,
            LS–4, CR–7         CR–3, TD–1
      4.2.7 Face reverse (up)
            LS–2, CR–5
   4.3 Left rough back. LS–6
   4.4 Right rough back. LS–5  CR–9, Break CR–19
      4.4.1 Left cross forward
      4.4.2 Right cross forward
   4.5 Left cross operate LS–8, CR–12
   4.6 Right cross operate LS–7, CR–11 (stop station 2)
   4.7 CR–11→left finish forward
   4.8 CR–12→right finish forward
   4.9 Left finish reverse. LS–9, CR–13, TD–3
   4.10 Right finish reverse. LS–4, CR–7
   4.11 Left finish back. LS–10, CR–14
      4.11.1 Plug stop main drive
      4.11.2 Left cross to station 1
      4.11.3 Right cross to station 3
   4.12 Right finish back. LS–11, CR–15
   4.13 Right cross at station 3. CR–4, CR–5→trip LS–7A
      4.13.1 Start chuck index motor
      4.13.2 Index stop chuck down
   4.14 Index motor stop. LS–12, CR–17
   4.15 Right drill forward  CR–11 and CR–17
   4.16 Right drill reverse. LS–4 and CR–7
   4.17 Right drill back. LS–13, CR–18, CR–18A
   4.18 Right cross to station 4. LS–7B, CR–11
   4.19 Right ream forward. CR–11 and CR–17
   4.20 Right ream reverse. LS–4 and CR–7
   4.21 Right ream back. LS–14 and CR–19
   4.22 Right cross to station 1. CR–19 hold
5. Open chuck The push buttons listed in the electrical equipment list above as being mounted on the chuck are used for controlling the semi-automatic operation of the improved machine tool 20. The other push buttons listed as being mounted on the setup box are used in setting up the machine tool 20 preparatory to the semi-automatic operation thereof.

When the machine tool 20 is being run with semi-automatic operation, the complete sequence of semi-automatic operations is carried out in 30 seconds on the rough hub workpiece 259′ after it is placed in the chuck unit 29 and the cycle start push button is pushed by the operator. It requires only 40 seconds from floor to floor for the operator to pick up a rough hub workpiece 259′ and to place it in the chuck unit 29, push the chuck close push button, and then the cycle start push button, wait for the semi-automatic cycle to be completed, push the chuck open push button, and remove the finished hub 259 and place it in its receiving space.

The workpiece 259′ is rotated in the chuck unit 29 at a speed which may be from upwards of 600 to 1900 surface feet per minute.

The rotary annular member 64 of the chuck has a relatively large bore permitting the entrance therein of the tools on the left side of the machine tool 20 for operating on the left end of the hub sleeve 260′. The rotary parts of the chuck unit 29 are relatively massive and have a flywheel effect which minimizes vibration in combination with the other working parts of the chuck.

A principal overall advantage of the improved machine tool 20 is its ability, after a single chucking of the workpiece, to perform a plurality of turning operations with the workpiece rotating, then to positively stop the workpiece at an indexed position, and to perform a plurality of holing operations thereon.

In the foregoing description, certain terms have been used for brevity, clearness, and understanding, but no unnecessary limitations are to be implied therefrom, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable equivalents thereof obvious to those skilled in the art, are set forth in the appended claims.

I claim:

1. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member having an opening extending therethrough and the axis of rotation extending through the opening of chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, a spindle unit operatively mounted on the base at one side of the chuck unit for movement towards and away from the chuck jaws, the spindle unit including a spindle adapted for mounting a rotary holing tool and motor means for rotating the spindle, means for moving the spindle unit towards and away from the chuck jaws, positive chuck stop and positioning means for the rotary parts of the chuck unit, the positive chuck stop and positioning means including a stop and positioning bar operatively mounted on one side of the chuck unit housing for movement towards and away from the axis of rotation and between outer and inner stationary positions, motor means for effecting the movements of the stop and positioning bar, the rotatable parts of the chuck unit including a stop block mounting member having a terminal end face located in a first plane perpendicular to the axis of rotation, and the stop and positioning bar being movable in a second plane perpendicular to the axis of rotation and longitudinally spaced in the direction of the axis of rotation from the first plane and in the direction away from the chuck unit housing whereby at its inner stationary position the stop and positioning bar extends crosswise of the terminal end face, a stop block on the terminal end face, the stop block being rotatable in a path traversed by the stop and positioning bar at its inner stationary position, second control means for the stop and positioning bar moving motor means, the first and second control means having means operatively associating them with each other whereby the second control means operates the motor means for the stop and positioning bar to maintain the bar in its outer stationary position when the first control means has operated to start the rotary drive motor and whereby the bar is moved to its inner stationary position when the rotary drive motor is stopped.

2. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member having an opening extending therethrough and the axis of rotation extending through the opening of the chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, a spindle unit operatively mounted on the base at one side of the chuck unit for movement towards and away from the chuck jaws, the spindle unit including a spindle adapted for mounting a rotary holing tool and motor means for rotating the spindle, means for moving the spindle unit towards and away from the chuck jaws, positive chuck stop and positioning means for the rotary parts of the chuck unit, the positive chuck stop and positioning means including a stop and positioning member movable between positions engaging and disengaging a rotary part of the chuck unit, motor means for moving the stop and positioning member between its engaging and disengaging positions, second control means for the stop and positioning member moving motor means, the first and second control means having means operatively associating them with each other whereby the second control means operates the motor means for moving the stop and positioning member to maintain the member in its engaging position when the first control means is operated to start the rotary drive motor and whereby the stop and positioning member is moved to its disengaging position when the rotary drive motor is stopped.

3. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, positive chuck stop and positioning means for the rotary parts of the chuck unit, the positive chuck stop and positioning means including a stop and positioning member movable between positions engaging and disengaging a rotary part of the chuck unit, motor means for moving the stop and positioning member between its engaging and disengaging positions, second control means for the stop and positioning member moving motor means, the first and second control having means operatively associating them with each other whereby the second control means operates the motor means for moving the stop and positioning member to maintain the member in its engaging position when the first control means is operated to start the rotary drive motor and whereby the stop and positioning member is moved to its disengaging position when the rotary drive motor is stopped.

4. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, positive chuck stop and positioning means for the rotary parts of the chuck unit, the positive chuck stop and positioning means including a stop and positioning bar operatively mounted on one side of the chuck unit housing for movement towards and away from the axis of rotation and between outer and inner stationary positions, motor means for effecting the movements of the stop and positioning bar, the rotatable parts of the chuck unit including a stop block mounting member having a terminal end face located in a first plane perpendicular to the axis of rotation, and the stop and positioning bar being movable in a second plane perpendicular to the axis of rotation and longitudinally spaced in the direction of the axis of rotation from the first plane and in the direction away from the chuck unit housing whereby at its inner stationary position the stop and positioning bar extends crosswise of the terminal end face, a stop block on the terminal end face, the stop block being rotatable in a path traversed by the stop and positioning bar at its inner stationary position, second control means for the stop and positioning bar moving motor means, the first and second control means having means operatively associating them with each other whereby the second control means operates the motor means for the stop and positioning bar to maintain the bar in its outer stationary position when the first control means has operated to start the rotary drive motor and whereby the bar is moved to its inner stationary position when the rotary drive motor is stopped.

5. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, positive chuck stop and positioning means for the rotary parts of the chuck unit, the positive chuck stop and positioning means including a stop and positioning member movable between positions engaging and disengaging a rotary part of the chuck unit, motor means for moving the stop and positioning member between its engaging and disengaging positions, and second control means for the stop and positioning member moving motor means.

6. In a machine tool as set forth in claim 5, and in which the stop and positioning member is a reciprocating member.

7. In a machine tool as set forth in claim 6, and in which the motor means for moving the stop and positioning member is a reciprocating motor.

8. In a machine tool as set forth in claim 7, and in which the reciprocating motor is a double-acting fluid operated reciprocating motor.

9. In a machine tool as set forth in claim 8, and in which the second control means includes solenoid operated valve means for the double-acting fluid operated reciprocating motor.

10. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, positive chuck stop and positioning means for the rotary parts of the chuck unit, the positive chuck stop and positioning means including a stop and positioning bar operatively mounted on one side of the chuck unit housing for movement towards and away from the axis of rotation and between outer and inner stationary positions, motor means for effecting the movements of the stop and positioning bar, the rotatable parts of the chuck unit including a stop block mounting member having a terminal end face located in a first plane perpendicular to the axis of rotation, and the stop and positioning bar being movable in a second plane perpendicular to the axis of rotation and longitudinally spaced in the direction of the axis of rotation from the first plane and in the direction away from the chuck unit housing whereby at its inner stationary position the stop and positioning bar extends crosswise of the terminal end face, a stop block on the terminal end face, the stop block being rotatable in a path traversed by the stop and positioning bar at its inner stationary position, and second control means for the stop and positioning bar moving motor means.

11. In a machine tool, a base, a chuck unit mounted upon and extending angularly from the base, the chuck unit including a housing and rotatable parts operatively mounted in the housing for rotation about an axis spaced from the base, the rotatable parts of the chuck unit including a chuck jaw mounting member and chuck jaws operatively mounted in the chuck jaw mounting member for movement towards and away from the axis of rotation and means for effecting the movements of the chuck jaws, power drive means for selectively rotating the rotatable parts of the chuck unit, the power drive means including a rotary drive motor, first control means for starting and stopping the rotary drive motor of the power drive means, positive chuck stop and positioning means for the rotary parts of the chuck unit, the positive chuck stop and positioning means including a stop block on one of the rotatable parts of the chuck unit, the stop block clearing one side of the chuck unit housing, a stop and positioning bar operatively mounted for movement on the side of the chuck unit housing cleared by the stop block, the movements of the stop and positioning bar being towards and away from the axis of rotation and between outer and inner stationary positions, motor means for effecting the movements of the stop and positioning bar, the stop block being rotatable in a path traversed by the stop and positioning bar at its inner stationary position and cleared by the stop and positioning bar at its outer stationary position, and second control means for the stop and positioning bar moving motor means.

12. In a machine tool as set forth in claim 11, and in which the stop and positioning bar is a reciprocating bar.

13. In a machine tool as set forth in claim 12, and in which the motor means for effecting the movements of the stop and positioning bar is a reciprocating motor.

14. In a machine tool as set forth in claim 13, and in which the reciprocating motor is a double-acting fluid operated reciprocating motor.

15. In a machine tool as set forth in claim 14, and in which the second control means includes solenoid operated valve means for the double-acting fluid operated reciprocating motor.

16. In a machine tool as set forth in claim 12, and in which the reciprocating stop and positioning bar has a limit switch mounted thereon, the limit switch including a reciprocating operating plunger depending therefrom in the path of the approaching stop block when the stop and positioning bar is at its inner stationary position, the direction of rotation of the approaching stop block in said path being forward and the opposite direction of rotation of the stop block being reverse, and the stop block having a cam surface adapted to impinge and raise the plunger of the limit switch during a reverse rotation of the stop block away from the stop and positioning bar.

17. In a machine tool as set forth in claim 16, and in which the power drive means includes a drive shaft, the rotary drive motor having a direct connection with the drive shaft, the rotary drive motor constituting a first rotary motor, a second rotary motor having a direct connection with the drive shaft, the speed of rotation of the second rotary motor being substantially less than the speed of rotation of the first rotary motor, each of the rotary motors being electric motors, an electric power line for each motor and a starter interposed in each electric power line, a control circuit for each starter including a power supply and conductors and coils in the starter and one or more switches, each starter being actuated to connect each motor with its power line when its control circuit is closed and being actuated to disconnect each motor from its power line when its control circuit is open, the limit switch on the reciprocating stop and positioning bar being interposed in the control circuit for the second rotary motor and being operative to close the control circuit for the second rotary motor when the plunger is raised during a reverse rotation of the stop block away from the stop and positioning bar, and the limit switch being operative to open the control circuit for the second rotary motor after a forward rotation of the stop block to an abutment with the stop and positioning bar.

18. In a chuck unit and the like for a machine tool and the like, the chuck unit and the like including a housing and a rotary member operatively mounted in the housing for rotation about an axis, power drive means for selectively rotating the rotary member, the power drive means including a rotary drive motor, first control means for starting and stopping the rotary drive motor of the power drive means, positive stop and positioning means for the rotary member, the positive stop and positioning means including a stop block on the rotary member, the stop block clearing one side of the housing, a stop and positioning bar operatively mounted for movement on the side of the housing cleared by the stop block, the movements of the stop and positioning bar being towards and away from the axis of rotation and between outer and inner stationary positions, motor means for effecting the movements of the stop and positioning bar, the stop block being rotatable in a path traversed by the stop and positioning bar at its inner stationary position and cleared by the stop and positioning bar at its outer stationary position, and second control means for the stop and positioning bar moving motor means.

19. In a chuck unit and the like for a machine tool and the like as set forth in claim 18, and in which the stop and positioning bar is a reciprocating bar.

20. In a chuck unit and the like for a machine tool and the like as set forth in claim 19, and in which the reciprocating stop and positioning bar has a limit switch mounted thereon, the limit switch including a reciprocating operating plunger depending therefrom in the path of the approaching stop block when the stop and positioning bar is at its inner stationary position, the direction of rotation of the approaching stop block in said path being forward and the opposite direction of rotation of the stop block being reverse, and the stop block having a cam surface adapted to impinge and raise the plunger of the limit switch during a reverse rotation of the stop block away from the stop and positioning bar.

21. In a chuck unit and the like for a machine tool and the like as set forth in claim 20, and in which the power drive means includes a drive shaft, the rotary drive motor having a direct connection with the drive shaft, the rotary drive motor constituting a first rotary motor, a second rotary motor having a direct connection with the drive shaft, the speed of rotation of the second rotary motor being substantially less than the speed of rotation of the first rotary motor, each of the rotary motors being electric motors, an electric power line for each motor and a starter interposed in each electric power line, a control circuit for each starter including a power supply and conductors and coils in the starter and one or more switches, each starter being actuated to connect each motor with its power line when its control circuit is closed and being actuated to disconnect each motor from its power line when its control circuit is open, the limit switch on the reciprocating stop and positioning bar being interposed in the control circuit for the second rotary motor and being operative to close the control circuit for the second rotary motor when the plunger is raised during a reverse rotation of the stop block away from the stop and positioning bar, and the limit switch being operative to open the control circuit for the second rotary motor after a forward rotation of the stop block to an abutment with the stop and positioning bar.

22. In a machine tool, a base, a chuck unit mounted upon and extending angularly from the base, the chuck unit including a housing and rotatable parts operatively mounted in the housing for rotation about an axis spaced from the base, the housing having an end face, a carriage operatively mounted for movement on the base in the direction of the axis of rotation and towards and away from the housing end face, a cross slide operatively mounted for movement on the carriage in a direction at right angles to the direction of movement of the carriage, releasable index stop means for stopping the cross slide at selected positions with respect to the carriage, and reciprocating motor means for operating the index stop means.

23. In a machine tool, a base, a chuck unit mounted upon and extending angularly from the base, the chuck unit including a housing and rotatable parts operatively mounted in the housing for rotation about an axis spaced from the base, the housing having an end face, a carriage operatively mounted for movement on the base in the direction of the axis of rotation and towards and away from the housing end face, one of the rotatable parts of the chuck unit and a part of the carriage being opposite each other, means for positively stopping the rotation of the rotatable parts of the chuck unit, the opposite chuck unit part and carriage part each having a set of means interengageble with the set of the other when the chuck unit rotatable parts are positively stopped and means on the housing registering with the sets of interengaging means and engaged by one set when the chuck unit rotatable parts are positively stopped.

STANFORD OVSHINSKY.

REFERENCES CITED

The following references are of record in the file of this patent:

UNITED STATES PATENTS

| Number | Name | Date |
| --- | --- | --- |
| 269,791 | Johnston | Dec. 26, 1882 |
| 737,974 | Todd | Sept. 1, 1903 |
| 1,841,422 | Stull | Jan. 19, 1932 |
| 2,191,137 | Trible | Feb. 20, 1940 |